United States Patent
Hoshino et al.

(10) Patent No.: US 12,197,724 B2
(45) Date of Patent: Jan. 14, 2025

(54) MEMORY SYSTEM AND METHOD FOR CONTROLLING THE SAME

(71) Applicant: Kioxia Corporation, Tokyo (JP)

(72) Inventors: Hiromi Hoshino, Kawasaki Kanagawa (JP); Yoko Masuo, Iruma Saitama (JP)

(73) Assignee: Kioxia Corporation, Tokyo (JP)

( * ) Notice: Subject to any disclaimer, the term of this patent is extended or adjusted under 35 U.S.C. 154(b) by 137 days.

(21) Appl. No.: 18/175,468

(22) Filed: Feb. 27, 2023

(65) Prior Publication Data

US 2024/0069723 A1    Feb. 29, 2024

(30) Foreign Application Priority Data

Aug. 30, 2022   (JP) ................. 2022-136469

(51) Int. Cl.
*G06F 3/06*    (2006.01)

(52) U.S. Cl.
CPC ............ *G06F 3/0604* (2013.01); *G06F 3/064* (2013.01); *G06F 3/0679* (2013.01)

(58) Field of Classification Search
CPC ...... G06F 3/0604; G06F 3/064; G06F 3/0679; G06F 3/0608
See application file for complete search history.

(56) References Cited

U.S. PATENT DOCUMENTS

| | | | |
|---|---|---|---|
| 11,221,945 B2 | 1/2022 | Hattori | |
| 11,487,450 B1* | 11/2022 | Gunda | ............... G06F 12/1009 |
| 2017/0315891 A1* | 11/2017 | Park | ...................... G11C 29/88 |
| 2018/0190329 A1* | 7/2018 | Kathawala | .......... G06F 12/0246 |
| 2020/0310960 A1 | 10/2020 | Hattori | |
| 2021/0012851 A1* | 1/2021 | Huang | ................ G11C 29/886 |
| 2021/0103519 A1 | 4/2021 | Bahirat et al. | |
| 2021/0240392 A1* | 8/2021 | Masuo | ..................... G06F 3/061 |
| 2021/0334030 A1* | 10/2021 | Yang | ....................... G06F 3/067 |
| 2022/0083222 A1* | 3/2022 | Numata | ................ G06F 3/0644 |
| 2024/0020231 A1* | 1/2024 | Ou | ....................... G06F 12/0253 |

* cited by examiner

*Primary Examiner* — Sean D Rossiter
(74) *Attorney, Agent, or Firm* — Kim & Stewart LLP

(57) ABSTRACT

A memory system connectable to a host includes a nonvolatile memory and a controller. The nonvolatile memory includes physical blocks. The controller is configured to assign each of a plurality of block groups, each block group including a predetermined number or more of the physical blocks, to one of categories. The controller assigns block groups having a total capacity equal to a fraction of the overprovisioning capacity that is equal to a first threshold value, to the first category, and block groups having a total capacity equal to a remaining part of the overprovisioning capacity to the third category. When an overprovisioning ratio falls below a second threshold value, the controller reassigns one or more block groups in the third category to the first category.

20 Claims, 17 Drawing Sheets

FIG. 8

| | NUMBER OF LOGICAL BLOCKS | NUMBER OF ACTIVE LOGICAL BLOCKS | NUMBER OF FREE LOGICAL BLOCKS | NUMBER OF REDUNDANT LOGICAL BLOCKS (NUMBER OF AVAILABLE LOGICAL BLOCKS) |
|---|---|---|---|---|
| BANK GROUP #1 | 280 | 120 | 30 | 130 (150) |
| BANK GROUP #2 | 290 | 100 | 50 | 140 (150) |
| BANK GROUP #3 | 200 | 40 | 80 | 80 (120) |
| BANK GROUP #4 | 230 | 140 | 70 | 20 (210) |

GEAR RATIO: HIGH ↓ (column: NUMBER OF FREE LOGICAL BLOCKS)

GEAR RATIO: LOW ↓ (column: NUMBER OF REDUNDANT LOGICAL BLOCKS)

| REGISTRATION ORDER | ERASE COUNT |
|---|---|
| SB#10 | 200 |
| SB#20 | 220 |
| SB#30 | 180 |
| SB#40 | 210 |
|  |  |
|  |  |

| REGISTRATION ORDER | ERASE COUNT |
|---|---|
| SB#10 | 300 |
| SB#20 | 200 |
| SB#30 | 120 |
| SB#40 | 210 |
|  |  |
|  |  |

MEMORY SYSTEM AND METHOD FOR CONTROLLING THE SAME

CROSS-REFERENCE TO RELATED APPLICATION

This application is based upon and claims the benefit of priority from Japanese Patent Application No. 2022-136469, filed Aug. 30, 2022, the entire contents of which are incorporated herein by reference.

FIELD

Embodiments described herein relate generally to memory systems and methods for controlling the same.

BACKGROUND

In recent years, memory systems having nonvolatile memories are widespread. As one of such memory systems, a solid state drive (SSD) having a NAND flash memory is known. A NAND flash memory has a plurality of blocks, each of which is a unit of data erasing.

In a memory system such as an SSD, a number of blocks corresponding to a capacity exceeding a capacity required for the memory system may be managed as redundant blocks that are not used for data writing. Generally, a block that is managed as a redundant block does not become a block available for the data writing.

BRIEF DESCRIPTION OF THE DRAWINGS

FIG. 8 is a diagram illustrating a bank group selection process based on a gear ratio executed in the memory system according to the first embodiment.

DETAILED DESCRIPTION

Embodiments provide a memory system and a method for controlling the memory system, to achieve effective use of blocks in redundant states.

In general, according to an embodiment, a memory system connectable to a host includes a nonvolatile memory and a controller. The nonvolatile memory includes a plurality of physical blocks. The controller is configured to assign each of a plurality of block groups, each block group including a predetermined number or more of the physical blocks, to one of a plurality of categories. The categories include a first category corresponding to block groups for storing user data, a second category corresponding to block groups for storing system data, a third category corresponding to redundant block groups in which neither the user data nor the system data can be stored, and a fourth category corresponding to defective block groups. The controller obtains an overprovisioning capacity, which is a capacity of the nonvolatile memory exceeding a sum of a predetermined user data capacity and a system data capacity, and assigns block groups having a total capacity equal to a fraction of the overprovisioning capacity that is equal to a first threshold value, to the first category, and block groups having a total capacity equal to a remaining part of the overprovisioning capacity to the third category. when an overprovisioning ratio, which is equal to a total capacity of block groups in the first category exceeding the predetermined user data capacity divided by the predetermined user data capacity, falls below a second threshold value, the controller reassigns one or more block groups in the third category to the first category such that the overprovisioning ratio is equal to the second threshold value or higher.

Hereinafter, embodiments will be described with reference to the drawings.

First Embodiment

Figure 1:
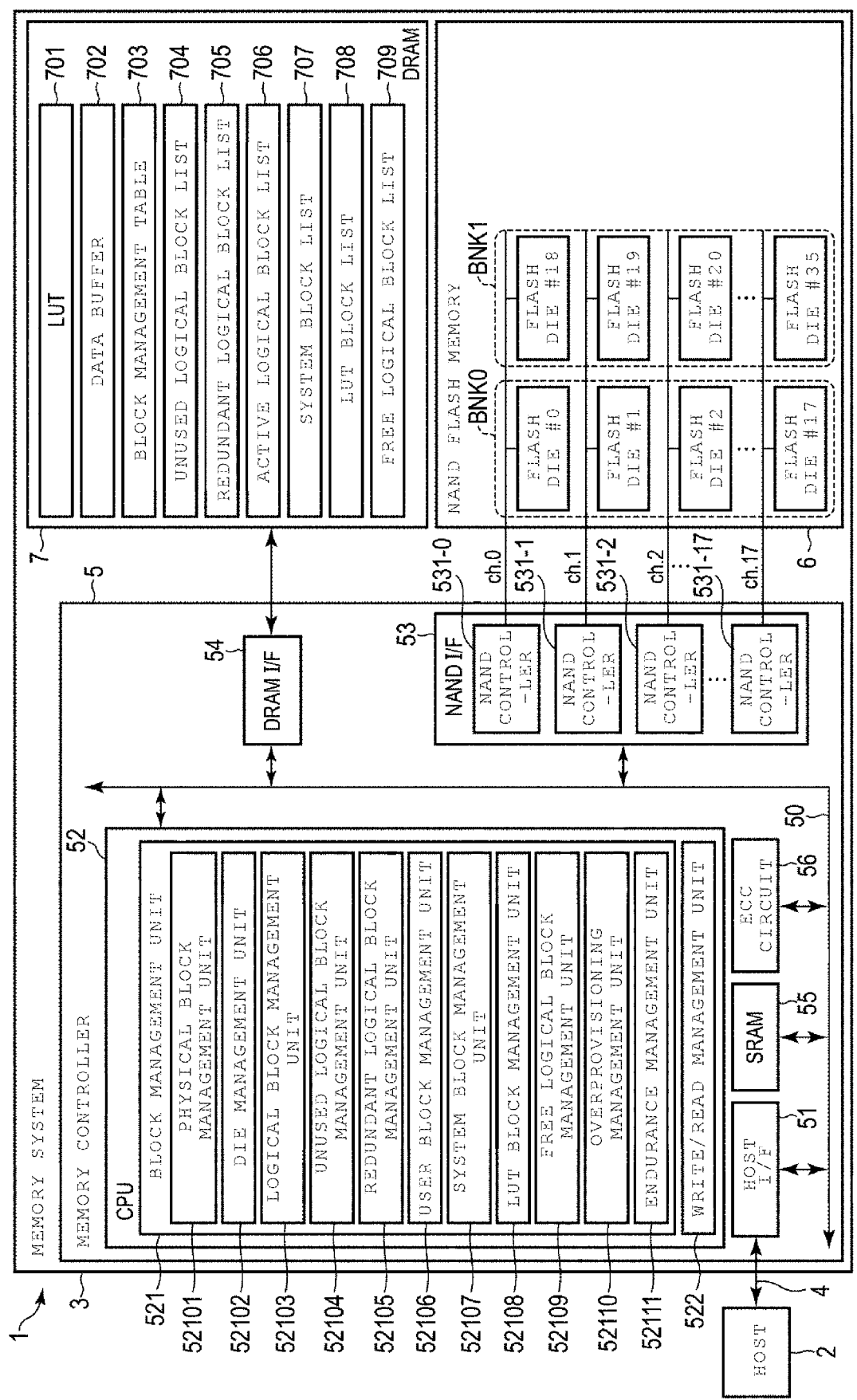
FIG. 1 is a block diagram illustrating a configuration example of an information processing system including a memory system according to a first embodiment.

FIG. 1 is a block diagram illustrating a configuration example of an information processing system 1 including a memory system 3 according to a first embodiment. The memory system 3 according to the first embodiment is a storage device including a nonvolatile memory.

The information processing system 1 includes a host (host device) 2 and the memory system 3. The host 2 and memory system 3 can be connected via a bus 4. Communication between the host 2 and the memory system 3 via the bus 4 is executed complying with, for example, an NVM Express™ (NVMe™) standard or a serial attached SCSI (SAS) standard.

The host 2 is an information processing device. The host 2 is, for example, a personal computer or a server computer. The host 2 accesses the memory system 3. Specifically, the host 2 transmits a write command, which is a command for writing data, to the memory system 3. The host 2 transmits a read command, which is a command for reading data, to the memory system 3. In addition, the host 2 transmits an invalidation command, which is a command for invalidating data, to the memory system 3. Examples of the invalidation commands are an unmap command and a trim command.

The memory system 3 is a semiconductor storage device. The memory system 3 is, for example, an SSD including a NAND flash memory 6, which is an example of the nonvolatile memory. The memory system 3 writes data to the nonvolatile memory. Then, the memory system 3 reads data from the nonvolatile memory.

The bus 4 is, for example, a bus complying with a PCI Express™ (PCIe™) standard or an SAS standard. The bus 4 is mainly used to transmit data and input/output commands (I/O commands) from the host 2 to the memory system 3 and to transmit data and a response from the memory system 3 to the host 2. The I/O command is a command for writing data to or reading data with respect to the nonvolatile memory. The I/O commands include, for example, the write command and the read command. Hereinafter, the write command transmitted from the host 2 to the memory system 3 is referred to as a host write command or a write request, and the read command transmitted from the host 2 to the memory system 3 is referred to as a host read command or a read request.

Next, an internal configuration of the memory system 3 will be described. The memory system 3 includes a memory controller 5, a NAND flash memory (hereinafter simply referred to as a flash memory) 6 and a dynamic random access memory (DRAM) 7.

The memory controller 5 is an example of a control circuit. Hereinafter, the memory controller 5 is simply referred to as a controller 5. The controller 5 is, for example, a semiconductor device such as a System-on-a-Chip (SoC). The controller 5 is communicably connected to the flash memory 6. The controller 5 executes data writing to the flash memory 6 and data reading from the flash memory 6. In addition, the controller 5 is connected to the DRAM 7 so as to be able to communicate therewith. The controller 5 executes data writing to the DRAM 7 and data reading from the DRAM 7. The controller 5 also communicates with the host 2 via the bus 4.

The flash memory 6 is a nonvolatile memory. The flash memory 6 is, for example, a two-dimensional flash memory or a three-dimensional flash memory. The flash memory 6 includes a plurality of blocks. A block is a minimum unit of erase of data stored in the flash memory 6. The blocks are also referred to as physical blocks or erase blocks. The block includes a plurality of pages. The page is a minimum unit of a data write operation, which is an operation of writing data to a memory cell array of the flash memory 6, and a data read operation, which is an operation of reading data from the memory cell array. The page includes, for example, a plurality of memory cells connected to the same word line. The page is also referred to as a physical page. The data write operation is also referred to as a program operation.

The DRAM 7 is a volatile memory. The DRAM 7 temporarily stores, for example, write data received from the host 2 or read data read from the flash memory 6. That is, a portion of the storage area of the DRAM 7 can be used as a data buffer 702. The DRAM 7 also temporarily stores information used to manage the memory system 3.

Next, an example of an internal configuration of the controller 5 will be described. The controller 5 includes a host interface (host I/F) 51, a CPU 52, a NAND interface (NAND I/F) 53, a DRAM interface (DRAM I/F) 54, a static RAM (SRAM) 55, and an ECC circuit 56. Each of these units is connected to an internal bus 50.

The host interface 51 is a hardware interface circuit. The host interface 51 executes communication with the host 2. The host interface 51 receives, for example, an I/O command and data from the host 2. The host interface 51 also transmits data and a response to the host 2.

The CPU 52 is a processor. The CPU 52 controls the host interface 51, the NAND interface 53, the DRAM interface 54, the SRAM 55, and the ECC circuit 56. The CPU 52 loads a control program (firmware) from a ROM (not illustrated) or the flash memory 6 into the SRAM 55 or the DRAM 7. The CPU 52 executes various processes by executing the control program (firmware). The CPU 52 executes management of data stored in the flash memory 6 and management of the blocks provided in the flash memory 6, for example, as a flash translation layer (FTL). The management of the data stored in the flash memory 6 is, for example, management of mapping information, which is information indicating a correspondence between each logical address and each physical address. The logical address is an address used by the host 2 to access the memory system 3. The logical address is, for example, an LBA (Logical Block Address). The physical address is an address indicating a physical storage location in the flash memory 6. In the flash memory 6, the data writing can be executed to one page of a block only once per program/erase cycle for the block. For this reason, the controller 5 writes updated data corresponding to a certain logical address to a different storage location other than the storage location in which previous data corresponding to that logical address is stored. For this reason, the CPU 52 manages the mapping between the logical addresses and the physical addresses by using a lookup table (LUT) 701. In addition, the CPU 52 executes a background operation for the management of the blocks provided in the flash memory 6. The background operation includes a garbage collection (GC) operation, a refresh operation, wear leveling, defective block management, and the like.

A GC operation is an operation of decreasing the number of active blocks and increasing the number of free blocks. The active block denotes a block including valid data and a block registered in an active logical block list 706. The free block is a block not including the valid data and a block registered in a free logical block list 709. The valid data is data stored at a storage location indicated by the physical address associated with the logical address as valid data. For example, the data stored in the storage location indicated by the physical address referenced in the LUT 701 is valid data. In addition, the valid data is data that may be read from the host 2 later. An invalid data is data stored in a storage location indicated by the physical address that is not associated with the logical address as valid data. For example, the data stored in the storage location indicated by unreferenced physical addresses in the LUT 701 is invalid data. The invalid data is data that is not likely to be read by the host 2. The GC operation is executed when the number of remaining free blocks is below a threshold value. In the GC operation, at least valid data is selected from the active blocks in which valid data and invalid data coexist, and the selected valid data is rewritten to another block.

A refresh operation is an operation of rewriting data stored in a refresh target block to another block. The refresh target block is a block including data of which number of error bits is determined to be a threshold value or more by the read operation such as a patrol read operation. The patrol read operation is an operation of detecting a block including erroneous data.

The wear leveling is an operation to reduce a variation in wear rates of blocks provided in the flash memory 6. For example, a block program/erase cycle (that is, the number of times of erase operations, which may be referred to as an erase count) is referred to for a wear rate of a block. The wear rates of the blocks can be made uniform by preferentially using blocks with a relatively low wear rate. The wear rate is also referred to as an exhaustion rate.

The defective block management is to manage defective blocks as blocks that are not used as data write destinations. The defective block is a block to which data cannot be written normally in, for example, the data write operation, or a block from which data cannot be read correctly in the data read operation. The defective block is also referred to as a bad block.

The NAND interface 53 is a circuit that controls the flash memory 6. The NAND interface 53 is electrically connected to a plurality of flash dies (hereinafter referred to as dies) provided in the flash memory 6. The die is a nonvolatile memory die. The die is also referred to as a nonvolatile memory chip. The NAND interface 53 includes NAND controllers 531-0, 531-1, 531-2, . . . , 531-17. The NAND controllers 531-0, 531-1, 531-2, . . . , 531-17 are connected to ch.0, ch.1, ch.2, . . . , ch.17, respectively. Each of the NAND controllers 531-0, 531-1, 531-2, . . . , 531-17 is connected to one or a plurality of dies through each corresponding channel. In FIG. 1, illustrated is a case where each of the channels ch.0, ch.1, ch.2, . . . , ch.17 is connected to two dies. In this case, the NAND controller 531-0 is connected to the dies #0 and #18 through the channel ch.0. The NAND controller 531-1 is connected to the dies #1 and #19 through the channel ch.1. The NAND controller 531-2 is connected to the dies #2 and #20 through the channel ch.2. Then, the NAND controller 531-17 is connected to the dies #17 and #35 through the channel ch.17. The dies #0, #1, #2, . . . , #17 are treated by the controller 5 as a bank BNK0. Similarly, the dies #18, #19, #20, . . . , #35 are treated by the controller 5 as a bank BNK1. The bank is a unit of operating the plurality of dies in parallel by an interleave operation.

The DRAM interface 54 is a circuit that controls the DRAM 7. The DRAM interface 54 stores data in the DRAM 7 and reads the data stored in the DRAM 7.

The SRAM 55 is a volatile memory. The SRAM 55 can be used, for example, as a write buffer that temporarily stores write data received from the host 2. The SRAM 55 can also be used, for example, as a read buffer that temporarily stores data read from the flash memory 6.

The ECC circuit 56 is a circuit that executes encoding of data and decoding of data. The ECC circuit 56 executes the encoding by adding an error correction code (ECC) to the data as a redundant code when writing the data to the flash memory 6. The ECC circuit 56 executes the decoding that is executing error correction of the read data by using the ECC added to the data read from the flash memory 6.

Next, an example of a functional configuration of the CPU 52 will be described.

The CPU 52 includes a block management unit 521 and a write/read management unit 522.

The block management unit 521 manages a plurality of blocks used in the memory system 3. The block management unit 521 manages the blocks in the memory system 3 by using various lists stored in the DRAM 7.

The block management unit 521 includes a physical block management unit 52101, a die management unit 52102, a logical block management unit 52103, an unused logical block management unit 52104, a redundant logical block management unit 52105, a user block management unit 52106, a system block management unit 52107, an LUT block management unit 52108, a free logical block management unit 52109, an overprovisioning management unit 52110, and an endurance management unit 52111.

The physical block management unit 52101 manages information indicating individual physical block by using a block management table 703. The individual physical block is identified, for example, by a die identifier and a physical block address in the die identified by the die identifier, or by a die identifier, a plane identifier in the die identified by the die identifier, and a physical block address in the plane identified by the plane identifier.

The die management unit 52102 manages each of the plurality of dies provided in the flash memory 6. The die management unit 52102 identifies the individual die by a channel number and a bank number.

The logical block management unit 52103 configures the plurality of logical blocks from a set of the physical blocks provided in each of the dies #0 to #35. The logical block includes the plurality of physical blocks provided in each of the plurality of dies among the dies #0 to #35. The logical block is also referred to as a block group or a super block. Each of the plurality of logical blocks is a set of physical blocks provided in different dies. Each of the plurality of logical blocks includes, for example, a total of 36 physical blocks respectively provided in the dies #0 to #35. It is noted that, when each of the dies #0 to #35 has a two-plane configuration, each of the plurality of logical blocks includes, for example, 72 (=36 dies×2 planes) physical blocks. Each of the plurality of logical blocks includes logical pages of which number is the same as the number of pages (physical pages) provided in one physical block. One logical page includes physical pages of which number is the same as physical blocks provided in the logical block. For example, when one logical block is configured with the physical blocks #1 to #10, and each of the physical blocks #1 to #10 includes the physical pages #1 to #255, the logical block includes the logical page #1 to #255. Each of the logical pages #1 to #255 includes 10 physical pages of which number is the same as the number of physical blocks #1 to #10. For example, the logical page #1 is a set of the 10 physical pages #1, each of which is provided in the physical blocks #1 to #10. The logical page is also referred to as a page group or a super page. The logical block management unit 52103 selects one logical block from the plurality of logical blocks and assigns the selected logical block as a write destination block. The write destination block is a block (logical block) to which data is to be written.

The unused logical block management unit 52104 manages the logical blocks determined not to be used for the data writing. The unused logical block management unit 52104 registers the logical blocks not to be used for the data writing in an unused logical block list 704. The unused logical block management unit 52104 registers, for example, the logical blocks for which block dismantling has been executed in the unused logical block list 704. The logical blocks registered in the unused logical block list 704 are referred to as unused logical blocks. The logical block for which the block dismantling has been executed is a logical block including the defective blocks of which number is a predetermined number or more. In addition, physical blocks that are not defective blocks provided in the logical block for which the block dismantling has been executed can be newly assigned as other logical blocks instead of the defective blocks provided in other logical blocks.

The redundant logical block management unit 52105 manages the redundant logical blocks, which are the extra logical blocks that do not need to be used in the memory system 3. Among maximum storage capacities of the memory system 3, when an overprovisioning (OP) capacity, which is a capacity larger than a sum of a user data capacity of the memory system 3 and a system data capacity of the memory system 3, is a threshold value or more, the redundant logical block management unit 52105 registers logical blocks of which number corresponds to the capacity exceeding the threshold value among the overprovisioning capacities in the redundant logical block list 705. The logical block registered in the redundant logical block list 705 is referred to as a redundant logical block. The maximum storage capacity of the memory system 3 is a capacity corresponding to the number of logical blocks excluding the unused logical blocks and the redundant logical blocks among the logical blocks in the memory system 3. The maximum storage capacity of the memory system 3 at the time point of manufacture is a capacity corresponding to the total number of logical blocks of the memory system 3 because none of the logical blocks is the unused logical block or the redundant logical block. The user data capacity of the memory system 3 is a total size of user data that is presented to an external device (for example, host 2) and can be stored by the memory system 3. The system data capacity of the memory system 3 is a capacity in which data (also referred to as management data or system data) used for the management of the memory system 3 is stored. The threshold value to be compared with the overprovisioning capacity can be set so that the difference between the overprovisioning capacity of the memory system 3 determined to reach the life time and the overprovisioning capacity of the memory system 3 in an initial state is in any value. The initial state of the memory system 3 is a state in which a process of registering the logical block to be registered as a redundant logical block in the redundant logical block list 705 is completed.

The maximum storage capacity of the memory system 3 is reduced by registering the logical blocks in the redundant logical block list 705. It is assumed that the maximum storage capacity of the memory system 3 at the time of manufacture varies depending on the individual memory system 3. Therefore, in order to prevent the difference in the maximum storage capacity among the plurality of memory systems 3, the logical blocks with the number corresponding to the capacity exceeding the set threshold value are registered in the redundant logical block list 705.

The user block management unit 52106 manages the logical blocks used for data writing of the user data. The user data is, for example, data associated with the write command received from the host 2. The user block management unit 52106 registers the logical blocks available for the data writing of the user data in the active logical block list 706 or the free logical block list 709.

The user block management unit 52106 registers the logical blocks including the valid data in the active logical block list 706. Hereinafter, the logical block registered in the active logical block list 706 is referred to as an active logical block.

The user block management unit 52106 registers the logical blocks including no valid data in the free logical block list 709. The logical block registered in the free logical block list 709 is a logical block in which new data can be stored by executing an erasing operation. Hereinafter, the logical block registered in the free logical block list 709 is referred to as a free logical block.

The system block management unit 52107 manages the blocks for storing data used for the management of the memory system 3. The system block management unit 52107 registers the blocks for storing the data used for the management of the memory system 3 in the system block list 707. The system block management unit 52107 can manage the system blocks in units of a logical block or in units of a physical block. Hereinafter, the block registered in the system block list 707 is referred to as a system block.

The LUT block management unit 52108 manages the logical blocks storing the mapping information between the logical addresses and the physical addresses similarly to the LUT 701. The LUT block management unit 52108 registers the logical blocks storing the mapping information in the LUT block list 708. The blocks registered in the LUT block list 708 may be managed as the system blocks.

It is noted that the logical blocks registered in the system block list 707 and the logical blocks registered in the LUT block list 708 can also be managed as the active logical blocks when the logical blocks include the valid data.

The free logical block management unit 52109 manages the logical blocks that do not include valid data. The free logical block management unit 52109 registers the logical blocks including no valid data in the free logical block list 709. When the number of logical blocks registered in the free logical block list 709 is below a predetermined number, the free logical block management unit 52109 instructs the write/read management unit 522 to start the GC operation.

The overprovisioning management unit 52110 manages the overprovisioning capacity of the memory system 3 and the overprovisioning ratio. The overprovisioning ratio of the memory system 3 is calculated by (maximum storage capacity−(user data capacity+system data capacity))/user data capacity×100. For example, an execution frequency of the GC operation described later is determined based on the overprovisioning ratio calculated by the overprovisioning management unit 52110.

The endurance management unit 52111 monitors the wear rate and the like of logical blocks and manages the endurance of the memory system 3. The endurance management unit 52111 calculates an endurance value of, for example, the memory system 3. The endurance value is a value (percentage) indicating the wear rate of the rewrite endurance of the memory system 3. The endurance value is calculated by (the total number of times of erase operations in the memory system 3/the number of logical blocks corresponding to the maximum storage capacity)/an upper limit of the number of times of erase operations per physical block×100. The number of times of erase operations is the same as the number of program/erase cycles. The total number of times of erase operations in the memory system 3 is the total number of times of erase operations for each logical block corresponding to the maximum storage capacity of the memory system 3.

The write/read management unit 522 controls the operation of writing data to the flash memory 6 and the operation of reading data from the flash memory 6. The write/read management unit 522 generates a program command, which is an instruction for writing the data to the flash memory 6, and issues the generated program command to the flash memory 6 via the NAND interface 53 (NAND controllers 531-0 to 531-17). In addition, the write/read management unit 522 generates the read command, which is an instruction for reading data from the flash memory 6, and issues the generated read command via the NAND interface 53 (NAND controllers 531-0 to 531-17) to the flash memory 6.

The write/read management unit 522 generates the program command for the flash memory 6 based on, for example, the host write command, the GC operation, and the like.

The write/read management unit 522 receives the host write command via the host interface 51. The host write command designates at least the logical address corresponding to the write data to be written to the flash memory 6 and the size of the write data. The write/read management unit 522 receives the write data associated with the received host write command from the host 2 and stores the received write data in the data buffer 702. Then, the write/read management unit 522 determines a write destination storage location in the write destination block to which the write data is to be written. The write/read management unit 522 generates the program command for writing the data to the determined write destination storage location. The write/read management unit 522 issues the generated program command to the flash memory 6 via a command queue (not illustrated) and the NAND interface 53. In this manner, the write/read management unit 522 writes the data associated with the host write command to the write destination storage location in the write destination block.

In the GC operation, the write/read management unit 522 writes garbage collection (GC) data stored in the data buffer 702 to a copy destination block (GC destination block) of the flash memory 6. The GC data stored in the data buffer 702 is valid data read from a GC target block (GC source block). In the writing in the GC operation, the write/read management unit 522 also issues the program command to the flash memory 6 via the command queue (not illustrated) and the NAND interface 53.

The write/read management unit 522 also generates the read command to be issued to the flash memory 6 based on the host read command, the GC operation, and the like.

The write/read management unit 522 receives the host read command via the host interface 51. The host read command designates at least the logical address corresponding to the read data to be read from the flash memory 6 and the size of the read data. The write/read management unit 522 acquires the physical address corresponding to the logical address designated by the received host read command from the LUT 701. The write/read management unit 522 generates the read command for reading the data from the storage location indicated by the acquired physical address. The write/read management unit 522 issues the generated read command to the flash memory 6 via the command queue (not illustrated) and the NAND interface 53. In this manner, the write/read management unit 522 reads the data from the flash memory 6 according to the host read command. The write/read management unit 522 transmits the read data to the host 2 via the host interface 51.

In the GC operation, the write/read management unit 522 reads valid data from the GC source block. The GC source block is selected from the logical blocks registered in the active logical block list 706. The write/read management unit 522 stores the valid data read from the GC source block in the data buffer 702. In the reading in the GC operation, the write/read management unit 522 also issues the read command to the flash memory 6 via the command queue (not illustrated) and the NAND interface 53.

Next, information stored in the DRAM 7 will now be described. The DRAM 7 stores the LUT 701, the data buffer 702, the block management table 703, the unused logical block list 704, the redundant logical block list 705, the active logical block list 706, the system block list 707, the LUT block list 708, and the free logical block list 709. All or a portion of the information stored in the DRAM 7 may be stored in the SRAM 55 of the controller 5 instead of being stored in the DRAM 7.

The LUT 701 manages the mapping between each logical address and each physical address for each predetermined size such as a cluster.

The data buffer 702 is a storage area in which the data (user data) to be written to the flash memory 6, the data (user data) read from the flash memory 6, and the data read from the active logical block in the GC operation are temporarily stored.

The block management table 703 is a table that manages the information indicating the plurality of physical blocks in the logical block for each logical block.

The unused logical block list 704 is a list managing the logical blocks determined not to be used in the memory system 3.

The redundant logical block list 705 is a list managing the redundant logical blocks, which are extra logical blocks that do not need to be used in the memory system 3.

The active logical block list 706 is a list managing the active logical blocks, which are the logical blocks storing valid data.

The system block list 707 is a list managing the system blocks, which are the logical blocks used to store the management data. The management data includes, for example, the block management table 703 and various other data used for the management of the memory system 3.

The LUT block list 708 is a list managing the LUT blocks, which are the logical blocks used to store the LUT 701. The logical blocks registered in LUT block list 708 may also be registered in the system block list 707.

The free logical block list 709 is a list managing the free logical blocks, which are the logical blocks that do not store valid data.

Figure 2:
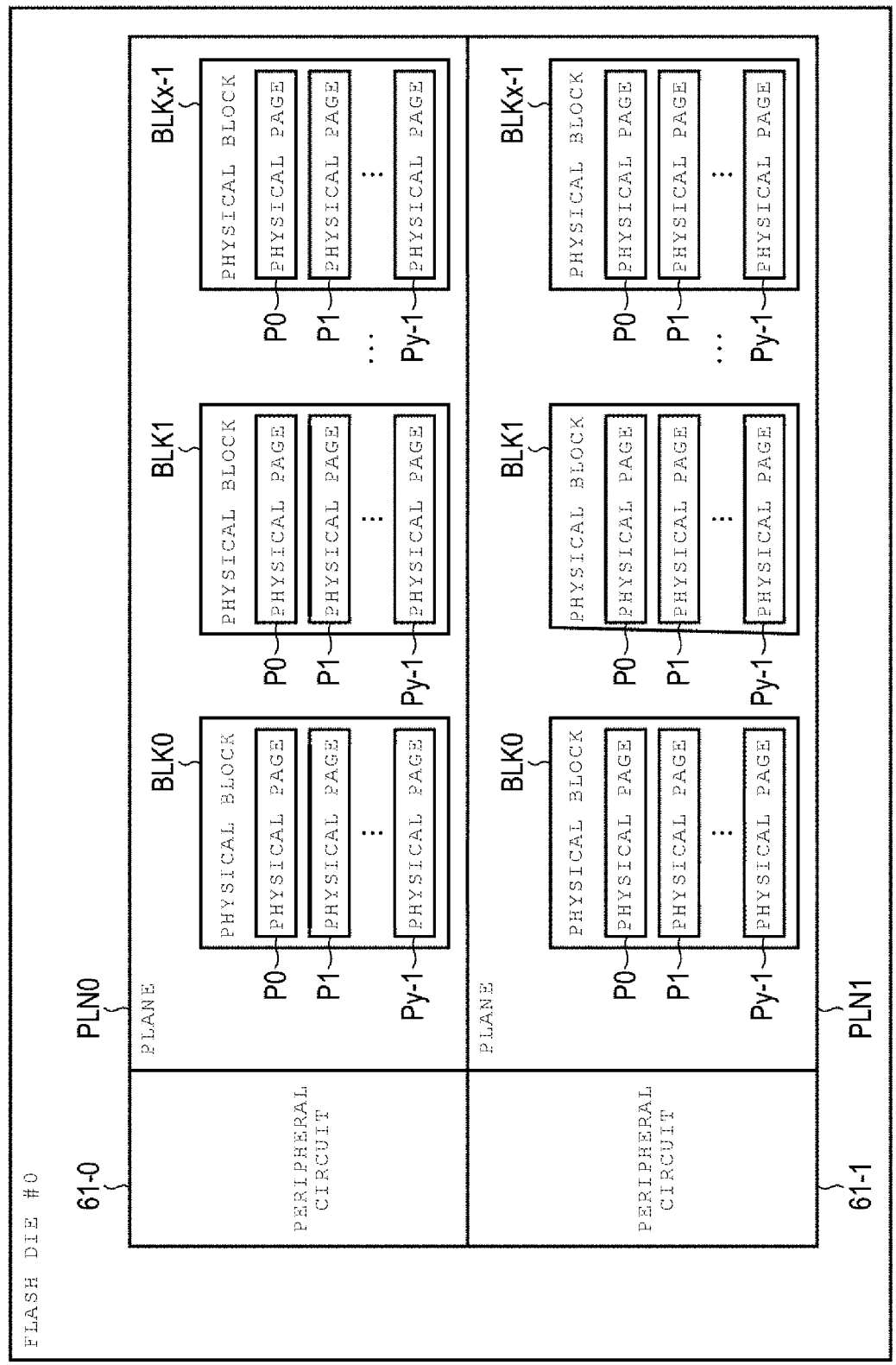
FIG. 2 is a block diagram illustrating a configuration example of a die of a flash memory provided in the memory system according to the first embodiment.

Next, a configuration example of the die of the flash memory 6 will be described. FIG. 2 is a block diagram illustrating a configuration example of a die #0 provided in the memory system 3 according to the present embodiment. Herein, a case where one die includes two planes will be described, but the number of planes provided in one die may be one or may be three or more.

The die #0 includes two planes (plane PLN0 and plane PLN1) and two peripheral circuits (peripheral circuit 61-0 and peripheral circuit 61-1) respectively corresponding to the two planes.

Each of the plane PLN0 and the plane PLN1 includes the memory cell array. Each memory cell array of the plane PLN0 and the plane PLN1 includes physical blocks BLK0 to BLKx−1. Each of the physical blocks BLK0 to BLKx−1 is a minimum unit of a data erasing operation (erase). The data erasing operation is an operation of erasing data stored in the flash memory 6. Each of the physical blocks BLK0 to BLKx−1 is also referred to as a erase block, a flash block, or a memory block. Each of the physical blocks BLK0 to BLKx−1 includes physical pages P0 to Py−1. Each of the physical pages P0 to Py−1 is a unit of a data write operation and a data read operation. Each of the physical pages P0 to Py−1 includes, for example, a plurality of memory cells connected to the same word line.

Each of the peripheral circuit 61-0 and the peripheral circuit 61-1 is a circuit that controls the memory cell array of the corresponding plane. Each of the peripheral circuit 61-0 and the peripheral circuit 61-1 include, for example, a cache, a row decoder, a column decoder, a sense amplifier, a page buffer, and a voltage generation circuit. Each of the peripheral circuit 61-0 and the peripheral circuit 61-1 execute the program operation, the read operation, or the erasing operation on the memory cell array in response to the reception of the address and the command from the NAND interface 53. Each of the peripheral circuit 61-0 and the peripheral circuit 61-1 temporarily stores data read from the plane PLN0 and the plane PLN1 and data to be written to the plane PLN0 and the plane PLN1.

Figure 3:
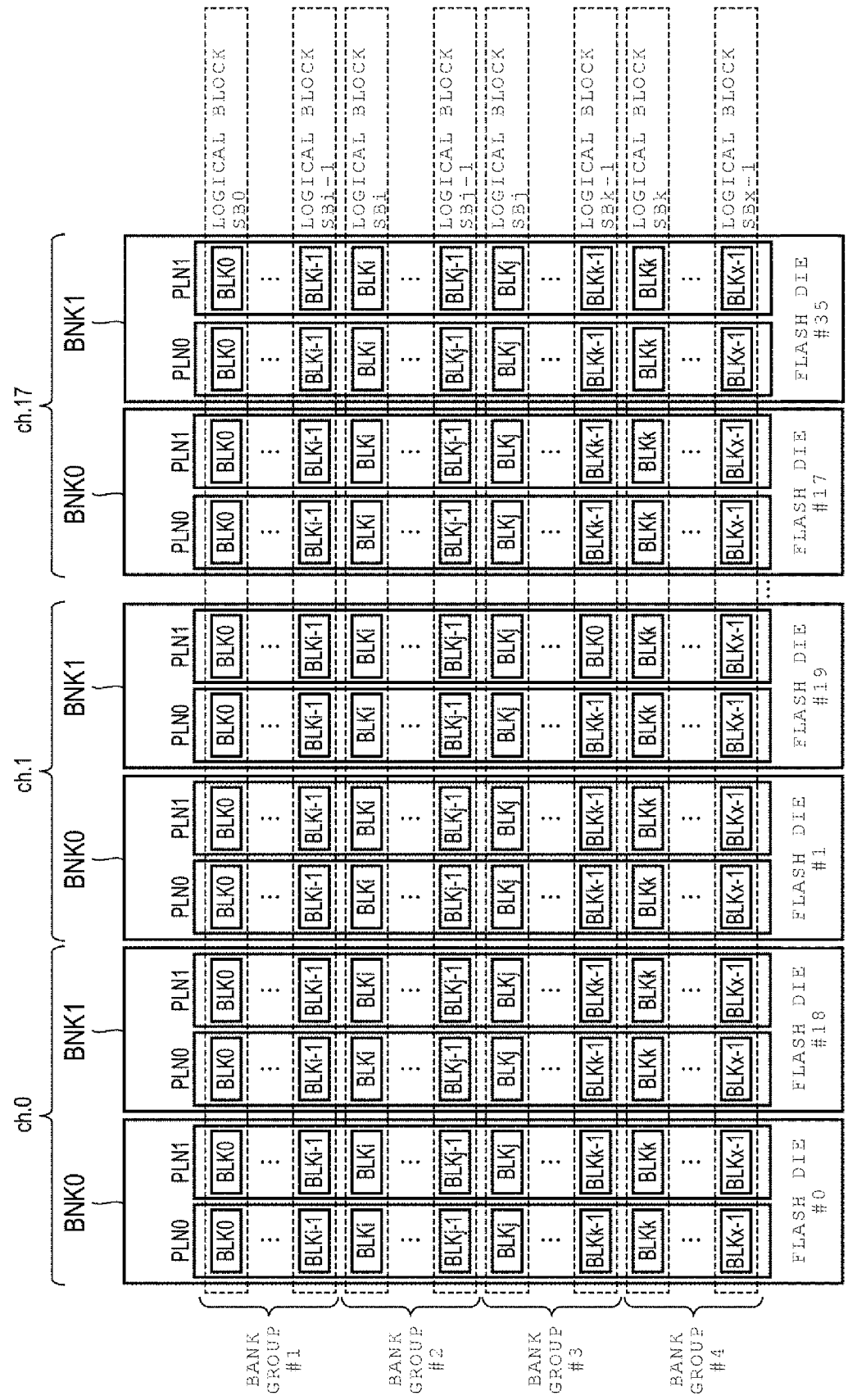
FIG. 3 is a block diagram illustrating a configuration example of a logical block used in the memory system according to the first embodiment.

Next, the logical blocks will be described. FIG. 3 is a block diagram illustrating a configuration example of the logical blocks used in the memory system 3 according to the present embodiment. Herein, a case where the number of channels is 18, the number of banks is 2, and the number of planes is 2 will be described.

One logical block includes a total of 72 physical blocks that are selected one by one from each plane of 36 dies (dies #0 to #35) corresponding to the configuration of 18 channels (ch.0 to ch.17)×2 banks (banks BNK0 and BNK1). It is noted that, when each of the dies #0 to #35 has a configuration including one plane, one logical block includes a total of 36 physical blocks selected one by one from the dies #0 to #35.

In FIG. 3, illustrated is a case where the x logical blocks including one logical block SB0 including the 72 physical blocks (herein, the physical block BLK0 of each of the planes PLN0 and PLN1 of each of the dies #0, #18, #1, #19, . . . , #17, #35) are configured.

Each of the x logical blocks belongs to one bank group among the plurality of bank groups. The bank group is a set of logical blocks in which plurality of logical blocks are grouped for parallel process of the plurality of logical blocks. The bank group is also referred to as a block group set. When there are four bank groups, the controller 5 can select one logical block from the plurality of logical blocks provided in each of the four bank groups and can execute data writing to the selected four logical blocks in parallel. The logical blocks SB0 to SBi−1 belong to the bank group #1. The logical blocks SBi to SBj−1 belong to the bank group #2. The logical blocks SBj to SBk−1 belong to the bank group #3. The logical blocks SBk to SBk−1 belong to the bank group #4.

In addition, each of the x logical blocks includes the logical pages (not illustrated), of which number is the same as the number of physical pages P0 to Py−1 provided in each of the physical blocks in the logical block. One logical page includes the 72 physical pages of which number is the same as the number of physical blocks provided in the logical block. For example, the logical page #0 of the logical block SB0 includes the physical page P0 of the physical block BLK0 of each of the planes PLN0 and PLN1 of each of dies #0, #18, #1, #19, . . . , #17, and #35.

Figure 4:
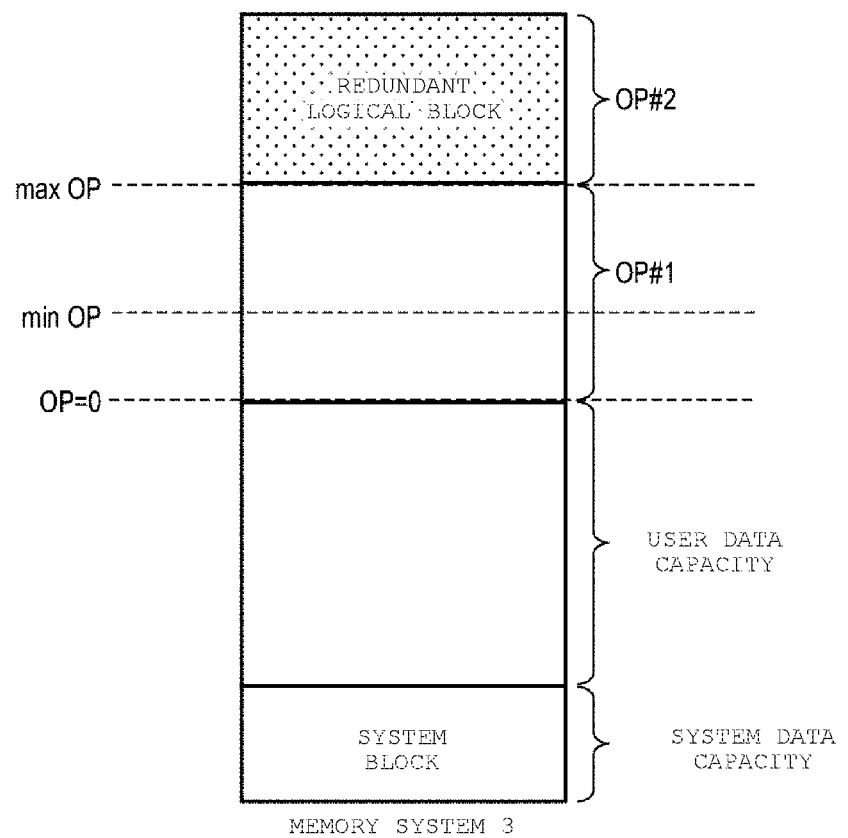
FIG. 4 is a diagram illustrating a relationship between logical blocks and capacities in the memory system according to the first embodiment.

Next, the overprovisioning capacity in the memory system 3 will be described. FIG. 4 is a diagram illustrating a relationship between the logical blocks in the memory system 3 and the capacities according to the first embodiment. In FIG. 4, illustrated are logical blocks of the memory system 3 other than the unused logical blocks.

The memory system 3 has the user data capacity, the system data capacity, and the overprovisioning capacity (OP #1 and OP #2). Each logical block other than the unused logical blocks corresponds to one of the user data capacity, the system data capacity, and the overprovisioning capacity.

The logical block corresponding to the user data capacity of the memory system 3 is managed as the active logical block or a user-available logical block among the free logical blocks. The user-available logical block is a logical block available for storing the user data.

The logical block corresponding to the system data capacity of the memory system 3 is a logical block that cannot be used to store the user data. The logical block corresponding to the system data capacity is managed as the system block.

The overprovisioning capacity is a capacity of the storage capacity of the memory system 3 that exceeds the sum of the user data capacity and the system data capacity. The overprovisioning capacity of the memory system 3 at the time point of manufacture differs for each individual memory system 3. When the storage capacity of the memory system 3 is the same as the sum of the user data capacity and the system data capacity, the overprovisioning capacity of the memory system 3 and the overprovisioning ratio are 0 (OP=0).

The controller 5 manages a min OP and a max OP as the threshold values for comparison with the overprovisioning ratio. The min OP is the overprovisioning ratio corresponding to a capacity to be guaranteed as the overprovisioning capacity of the memory system 3 in the initial state. The min OP is, for example, a value higher than the overprovisioning ratio of the memory system 3 determined to have reached the life time by a certain value. The max OP is the overprovisioning ratio corresponding to an upper limit value of the capacity allowed as the overprovisioning capacity of the memory system 3 in the initial state. The max OP is, for example, an overprovisioning ratio set so that the difference between the overprovisioning ratio of the memory system 3 determined to have reached the life time and the max OP is in a certain value. In addition, when the overprovisioning ratio of the memory system 3 is the min OP or more and is the max OP or less, the overprovisioning capacity of the memory system 3 is only OP #1. That is, the memory system 3 in the initial state does not have the logical block to be registered in the redundant logical block list 705. In addition, when the overprovisioning ratio of the memory system 3 exceeds the max OP, the overprovisioning capacity of the memory system 3 includes OP #1 and OP #2. Among the overprovisioning capacities of the memory system 3, the logical blocks of which the number corresponds to the capacity exceeding the max OP are registered in the redundant logical block list 705. Since the overprovisioning ratio of the memory system 3 illustrated in FIG. 4 exceeds the max OP, a predetermined number of logical blocks are registered in the redundant logical block list 705.

OP #1 is a storage capacity corresponding to the number of logical blocks available for storing the user data among the overprovisioning capacity. The logical block corresponding to OP #1 is managed as the free logical block.

OP #2 is a storage capacity corresponding to the number of logical blocks registered as the redundant logical blocks among the overprovisioning capacities. The logical block corresponding to OP #2 are excluded from the calculation of the maximum storage capacity of the memory system 3.

Then, when the overprovisioning ratio is below the min OP due to a reduction in the number of logical blocks available for the data writing, the controller 5 registers the redundant logical blocks in the free logical block list 709 so that the overprovisioning ratio is the min OP or more. Accordingly, the controller 5 can maintain the overprovisioning ratio of the memory system 3 at the min OP or more when the redundant logical block exists.

Herein, the case where the min OP, which is the lower limit value of the overprovisioning ratio, and the max OP, which is the upper limit value of the overprovisioning ratio, are set is illustrated, but only a designated overprovisioning ratio which is one threshold value may be set instead of the min OP and the max OP. When the overprovisioning ratio of the memory system 3 at the time point of manufacture is the designated overprovisioning ratio or less, the overprovisioning capacity of the memory system 3 in the initial state is only OP #1. In addition, when the overprovisioning ratio of the memory system 3 at the time of manufacture is the designated overprovisioning ratio or more, the overprovisioning capacity of the memory system 3 in the initial state includes OP #1 and OP #2. Among the overprovisioning capacities of the memory system 3, logical blocks of which the number corresponds to the capacity exceeding the designated overprovisioning ratio is registered in the redundant logical block list 705. Further, when the overprovisioning ratio of the memory system 3 is below the designated overprovisioning ratio due to a reduction in the number of logical blocks available for the data writing, the controller 5 registers the redundant logical block in the free logical block list 709 so that the overprovisioning ratio is the designated overprovisioning ratio or more. Accordingly, the controller 5 can maintain the overprovisioning ratio of the memory system 3 at the designated overprovisioning ratio or more when there is the redundant logical block. In other words, when only the designated overprovisioning ratio is set, for the threshold value used to determine the number of redundant logical blocks in the initial state and the threshold value used to determine whether to register the redundant logical blocks in the free logical block list 709, the designated overprovisioning ratios which is the same value for both cases will be used.

Figure 5:
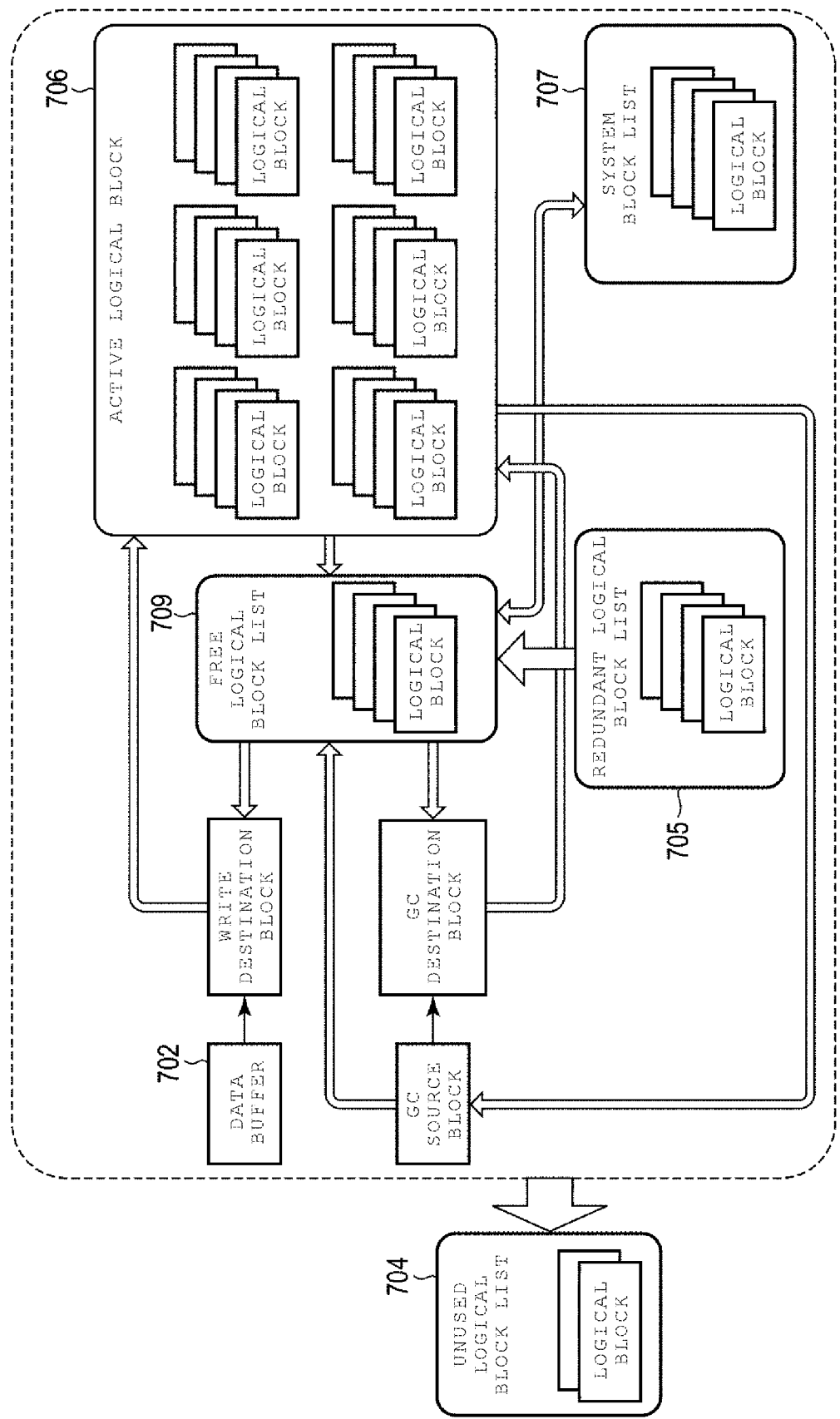
FIG. 5 is a diagram illustrating an example of a data write operation and a garbage collection (also referred to as "compaction") operation executed in the memory system according to the first embodiment.

Next, transition of the logical blocks in the data write operation and the GC operation will be described. FIG. 5 is a diagram illustrating an example of the data write operation and the GC operation executed in the memory system 3 according to the first embodiment.

The controller 5 executes the data write operation. In the data write operation, the controller 5 writes the data stored in the data buffer 702 to the write destination block. For example, the data write operation is executed based on the write command received from the host 2. The controller 5 temporarily stores the data associated with the received write command in the data buffer 702. Then, the controller 5 writes the data stored in the data buffer 702 to the logical block assigned as the write destination block. When there is no logical block assigned as the write destination block, the controller 5 selects any logical block from the free logical blocks registered in the free logical block list 709. The controller 5 executes the erasing operation on the selected logical block and assigns the logical block as the write destination block. When there is no storage area to which the data can be written in the write destination block, the controller 5 releases the assignment of the logical block as the write destination block. The controller 5 registers the released logical block in the active logical block list 706.

When the data write operation is executed on the logical address where the data write operation is already executed, the data previously written to the active logical block becomes invalid data. Accordingly, the active logical block of which all the stored data becomes invalid data is registered in the free logical block list 709 and reassigned as the free logical block.

In addition, the controller 5 executes the GC operation. In the GC operation, the controller 5 selects any logical block from the logical blocks registered in the active logical block list 706. The controller 5 selects, for example, the active logical block with a low ratio of valid data among the stored data. The controller 5 assigns the selected active logical block as the GC source block. The controller 5 reads valid data stored in the GC source block. The controller 5 writes the read valid data to the logical block assigned as the GC destination block. When there is no logical block assigned as the GC destination block, the controller 5 selects any logical block from the free logical blocks registered in the free logical block list 709. The controller 5 assigns the selected logical block as the GC destination block. The GC source block that does not include the valid data due to the writing of the valid data to the GC destination block is registered in the free logical block list 709. When there is no storage area to which data can be written in the GC destination block, the controller 5 releases the assignment of the logical block as the GC destination block. The controller 5 registers the released logical block in the active logical block list 706. Accordingly, the controller 5 can be allowed to increase the number of free blocks.

While the memory system 3 is operating, when the logical block in which an error that data cannot be read normally or data cannot be written normally is specified, the controller 5 registers the logical block in the unused logical block list 704. In this manner, when the logical block reassigned as the unused logical block, the number of logical blocks available for the data writing is reduced, and the overprovisioning ratio of the memory system 3 is reduced. For example, when the overprovisioning ratio is below the threshold value, the controller 5 selects the logical blocks registered in the redundant logical block list 705 so that the overprovisioning ratio exceeds the threshold value. Herein, the threshold value to be compared with the overprovisioning ratio is, for example, the min OP in FIG. 4 or the designated overprovisioning ratio. The controller 5 registers the selected logical block in the free logical block list 709. Accordingly, the logical blocks registered in the redundant logical block list 705 are reassigned as the logical blocks available for the data writing.

In the selection of the redundant logical blocks, the controller 5 may refer to, for example, a gear ratio. The gear ratio is a ratio of the number of GC destination blocks to which the data writing of valid data is completed to the number of write destination logical blocks to which the data writing is completed per unit time. In other words, the gear ratio is a ratio of the data writing executed based on the write commands received from the host 2 to the data writing executed based on the background operations including the GC operations. When the gear ratio is high, the memory system 3 executes the data writing at a high frequency based on the background operations. When the gear ratio is low, the memory system 3 executes the data writing at a high frequency based on the write commands received from the host 2.

In the selection of the redundant logical block, when the gear ratio is high, the controller 5 selects the redundant logical block provided in the bank group with the minimum number of free logical blocks. Accordingly, recovery of the number of free logical blocks by the GC operation in the selected bank group can be assisted.

In the selection of the redundant logical blocks, when the gear ratio is low, the controller 5 selects the redundant logical blocks provided in the bank group with the minimum number of available logical blocks. Accordingly, the number of available logical blocks provided in each bank group can be averaged.

In addition, as for the system blocks, the system blocks of which all the stored data are invalid data are registered in the free logical block list 709. When there is no system block to which new management information of the memory system 3 can be written, the controller 5 selects any free logical block and registers the selected free logical block in the system block list 707.

Figure 6:
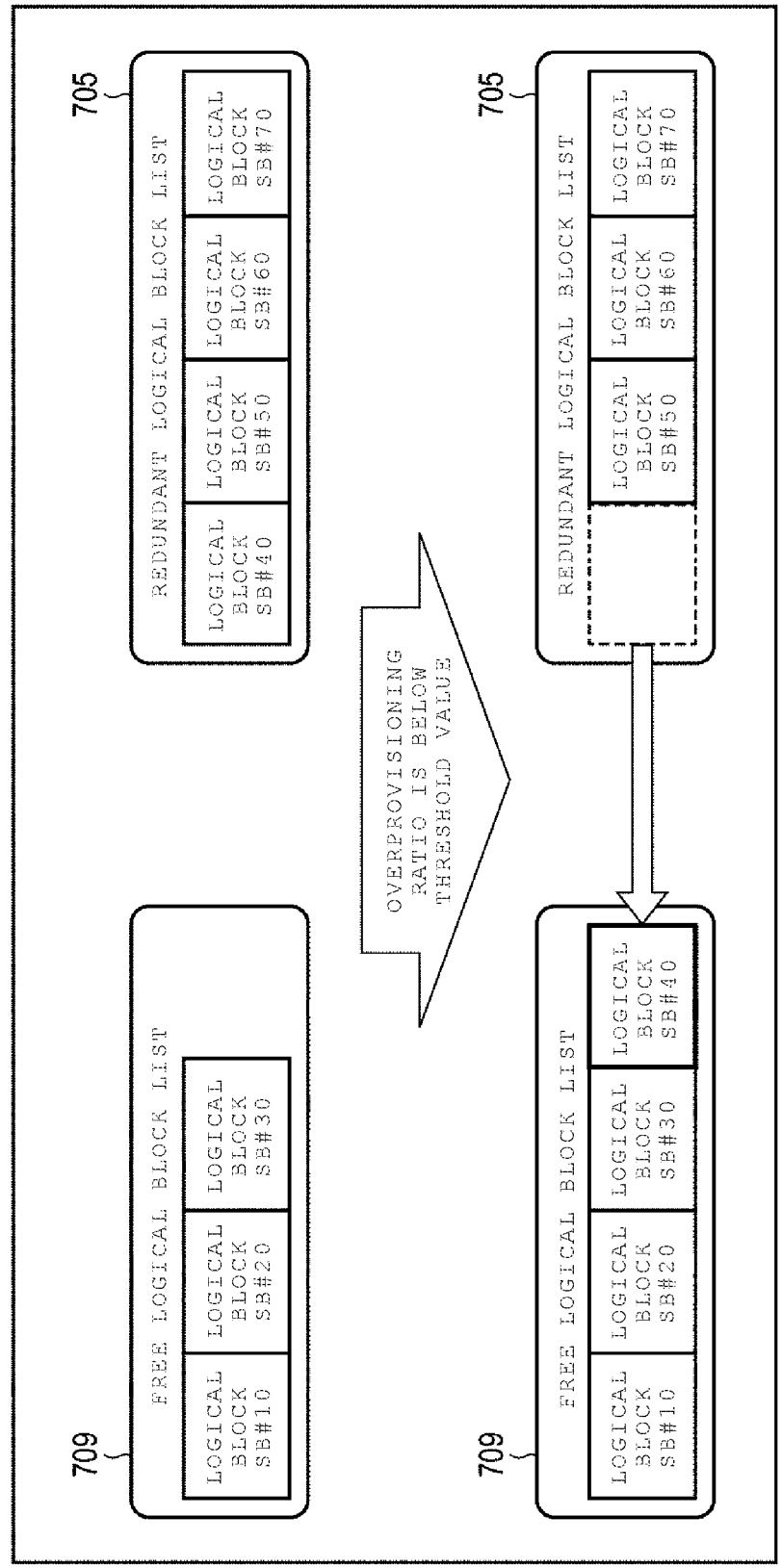
FIG. 6 is a diagram illustrating an example of a registration operation of a redundant logical block in a free block list, which is executed in the memory system according to the first embodiment.

Next, a registration operation of the redundant logical blocks in the free logical block list 709 will be described. FIG. 6 is a diagram illustrating an example of the registration operation of the redundant logical blocks in a free block list, which is executed in the memory system 3 according to the first embodiment.

First, in FIG. 6, logical blocks SB #10, SB #20, and SB #30 are free logical blocks registered in the free logical block list 709. Logical blocks SB #40, SB #50, SB #60, and SB #70 are redundant logical blocks registered in the redundant logical block list 705.

It is assumed that the overprovisioning ratio of the memory system 3 is below the threshold value. For example, when the logical block to be registered in the unused logical block list 704 due to the block dismantling is generated, the number of logical blocks available for the data writing in the memory system 3 is changed. In response to the change in the number of logical blocks available for the data writing, the controller 5 calculates the overprovisioning ratio of the memory system 3. When the calculated overprovisioning ratio is reduced from an original overprovisioning ratio, the controller 5 compares the calculated overprovisioning ratio with the threshold value. In response to the calculated overprovisioning ratio being below the threshold value, the controller 5 determines to restore the overprovisioning ratio. Therefore, the controller 5 restores the number of logical blocks available for the data writing by one.

First, the controller 5 selects any logical block registered in the redundant logical block list 705. Herein, the controller 5 selects the logical block SB #40. The controller 5 releases the logical block SB #40 from the redundant logical block list 705. The controller 5 registers the released logical block SB #40 in the free logical block list 709.

Accordingly, the controller 5 can increase the number of logical blocks available for the data writing in the memory system 3 by one. The overprovisioning ratio of the memory system 3 is restored to a value of the threshold value or more.

Figure 7:
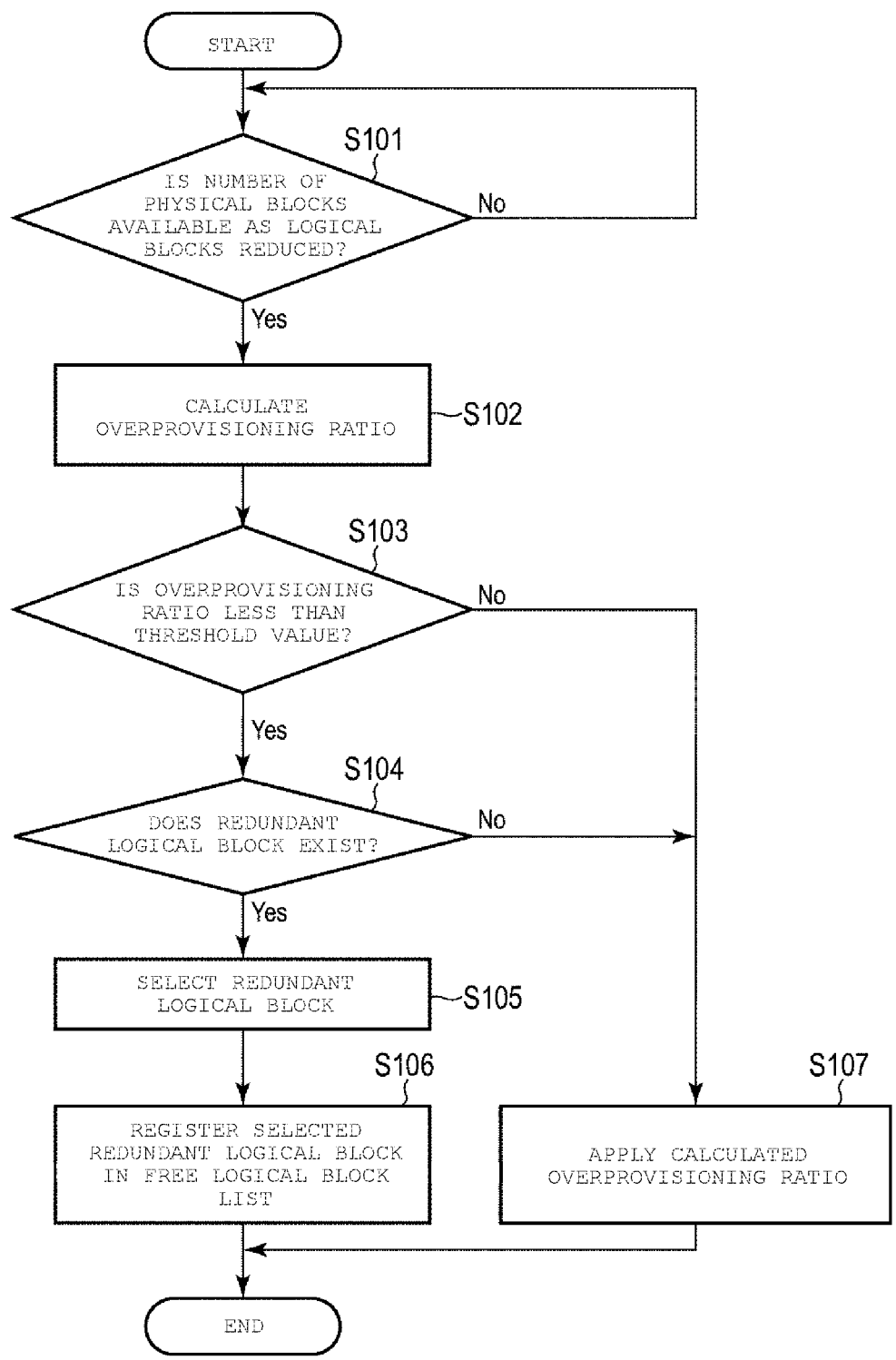
FIG. 7 is a flowchart illustrating a procedure of a logical block management process executed in the memory system according to the first embodiment.

Next, a logical block management process will be described. FIG. 7 is a flowchart illustrating a procedure of the logical block management process executed in the memory system 3 according to the first embodiment.

First, the controller 5 determines whether the number of physical blocks available as the logical blocks is reduced (S101). When the logical block is registered in the unused logical block list 704 due to the block dismantling or the failure in the data writing/reading, the number of physical blocks available as the logical blocks is reduced.

When the number of available physical blocks is not reduced (No in S101), the controller 5 waits until the number of available physical blocks is reduced.

When the number of available physical blocks is reduced (Yes in S101), the controller 5 calculates the overprovisioning ratio based on the maximum storage capacity of the memory system 3, the user data capacity of the memory system 3, and the system data capacity (S102).

The controller 5 determines whether the overprovisioning ratio is less than the threshold value (S103).

When the overprovisioning ratio is less than the threshold value (Yes in S103), the controller 5 determines whether the logical block registered in the redundant logical block list 705 exists (S104).

When the redundant logical block exists (Yes in S104), the controller 5 selects any logical block from the logical blocks registered in the redundant logical block list 705 (S105).

The controller 5 registers the redundant logical block selected in S105 in the free logical block list 709 (S106).

When the overprovisioning ratio is the threshold value or more (No in S103) or when there is no redundant logical block (No in S104), the controller 5 does not process the logical block and applies the overprovisioning ratio calculated in S102. (S107).

Next, selection of the redundant logical blocks to be registered in the free logical block list 709 will be described. FIG. 8 is a diagram illustrating a bank group selection process based on the gear ratio executed in the memory system 3 according to the first embodiment.

Herein, it is assumed that each of the plurality of logical blocks of the memory system 3 belongs to any of the four bank groups (bank groups #1 to #4) and none of the logical blocks is the unused logical block.

The bank group #1 includes 280 logical blocks. Among the 280 logical blocks provided in the bank group #1, the number of active logical blocks is 120, the number of free logical blocks is 30, and the number of redundant logical blocks is 130. Therefore, the number of logical blocks available for the data writing provided in the bank group #1 is 150 (=120+30).

The bank group #2 includes 290 logical blocks. Among the 290 logical blocks provided in the bank group #2, the number of active logical blocks is 100, the number of free logical blocks is 50, and the number of redundant logical blocks is 140. Therefore, the number of logical blocks available for the data writing provided in the bank group #2 is 150 (=100+50).

The bank group #3 includes 200 logical blocks. Among the 200 logical blocks provided in the bank group #3, the number of active logical blocks is 40, the number of free logical blocks is 80, and the number of redundant logical blocks is 80. Therefore, the number of logical blocks available for the data writing provided in the bank group #3 is 120 (=40+80).

The bank group #4 includes 230 logical blocks. Among the 230 logical blocks provided in the bank group #4, the number of active logical blocks is 140, the number of free logical blocks is 70, and the number of redundant logical blocks is 20. Therefore, the number of logical blocks available for the data writing provided in the bank group #4 is 210 (=140+70).

Before selecting the redundant logical blocks to be registered in the free logical block list 709, the controller 5 selects a bank group in response to the overprovisioning ratio becoming below the threshold value. Then, the controller 5 selects the redundant logical blocks from among the logical blocks belonging to the selected bank group.

When the gear ratio of the memory system 3 is higher than the threshold value, the controller 5 selects the bank group

1, which is the bank group with the minimum number of free logical blocks. Then, the controller 5 selects any redundant logical block from the redundant logical blocks provided in the bank group #1 and registers the selected redundant logical block in the free logical block list 709.

In addition, when the gear ratio of the memory system 3 is lower than the threshold value, the controller 5 selects the bank group #3, which is the bank group with the minimum number of logical blocks available for the data writing. Then, the controller 5 selects any redundant logical block from the redundant logical blocks provided in the bank group #3 and registers the selected redundant logical block in the free logical block list 709.

Figure 9:
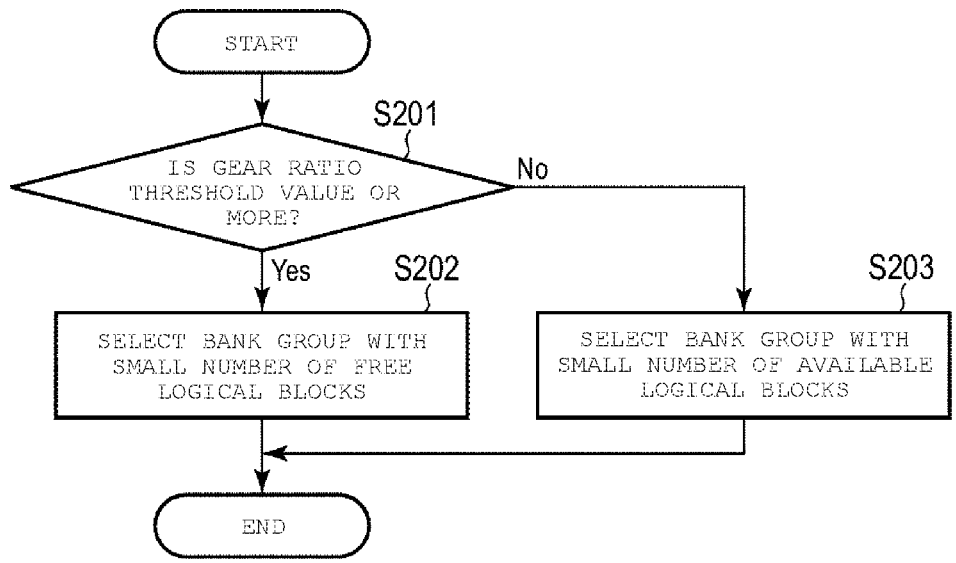
FIG. 9 is a flowchart illustrating a procedure of the bank group selection process based on the gear ratio executed in the memory system according to the first embodiment.

Next, a bank group selection process will be described. FIG. 9 is a flowchart illustrating a procedure of the bank group selection process based on the gear ratio executed in the memory system 3 according to the first embodiment.

First, the controller 5 determines whether the gear ratio of the memory system 3 is the threshold value or more (S201).

When the gear ratio is the threshold value or more (Yes in S201), the controller 5 selects the bank group with the minimum number of free logical blocks among the belonging logical blocks (S202).

When the gear ratio is less than the threshold value (No in S201), the controller 5 selects the bank group with the minimum number of logical blocks available for the data writing among the belonging logical blocks (S203).

Figure 10:
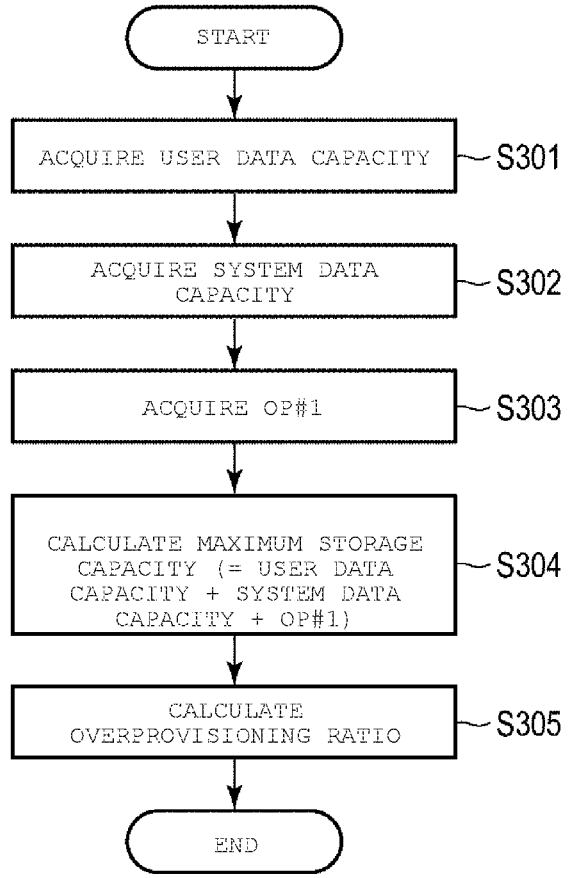
FIG. 10 is a flowchart illustrating a procedure of an overprovisioning ratio calculation process executed in the memory system according to the first embodiment.

Next, an overprovisioning ratio calculation process of the memory system 3 according to the first embodiment will be described. FIG. 10 is a flowchart illustrating a procedure of the overprovisioning ratio calculation process executed in the memory system 3 according to the first embodiment.

First, the controller 5 acquires the user data capacity of the memory system 3 (S301).

The controller 5 acquires a system data capacity of the memory system 3 (S302).

The controller 5 acquires OP #1 of the memory system 3 (S303).

The controller 5 calculates the maximum storage capacity by summing the user data capacity acquired in S301, the system data capacity acquired in S302, and the OP #1 acquired in S303 (S304).

The controller 5 calculates the overprovisioning ratio based on the user data capacity acquired in S301, the system data capacity acquired in S302, the OP #1 acquired in S303, and the maximum storage capacity calculated in S304 (S305).

Figure 11:
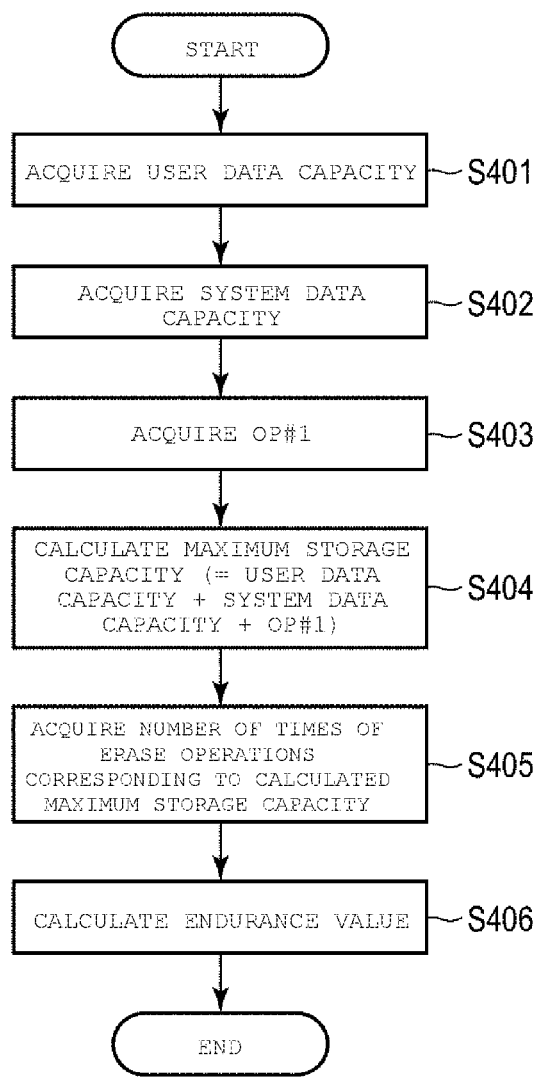
FIG. 11 is a flowchart illustrating a procedure of an endurance value calculation process executed in the memory system according to the first embodiment.

Next, an endurance value calculation process of the memory system 3 according to the first embodiment will be described. FIG. 11 is a flowchart illustrating procedures of the endurance value calculation process executed in the memory system 3 according to the first embodiment.

First, the controller 5 calculates the maximum storage capacity in the same procedure as the procedure from S301 to S304 in FIG. 10 (S401 to S404).

The controller 5 acquires the number of times of erase operations corresponding to the maximum storage capacity calculated in S404 as the number of times of erase operations in the memory system 3 (S405). The number of times of erase operations acquired in S405 is the sum of the number of times of erase operations of the respective logical blocks corresponding to the maximum storage capacity calculated in S404.

The controller 5 calculates the endurance value of the memory system 3 based on the maximum storage capacity calculated in S404, the number of times of erase operations acquired in S405, and the upper limit of the number of times of erase operations per physical block (S406).

As described above, according to the first embodiment, the controller 5 registers the redundant logical block in the free logical block list 709 as the overprovisioning ratio of the memory system 3 falls below the threshold value. The controller 5 can use the redundant logical blocks as logical blocks available for the data writing. Accordingly, the controller 5 can extend the lifetime of the memory system 3 due to the reduction in the overprovisioning ratio.

When the redundant logical block is registered in the free logical block list 709, a logical block with the number of times of erase operations of 0 is added. This increases the variation in the wear rates of the logical blocks available for the data writing.

Second Embodiment

Next, a memory system 3 according to a second embodiment will be described. The memory system 3 according to the second embodiment uses the redundant logical blocks as the logical blocks available for the data writing, while reducing the variation in the wear rates of logical blocks.

In the following description, the memory system 3 according to the second embodiment will be described by focusing on the differences from the memory system 3 according to the first embodiment.

Figure 12:
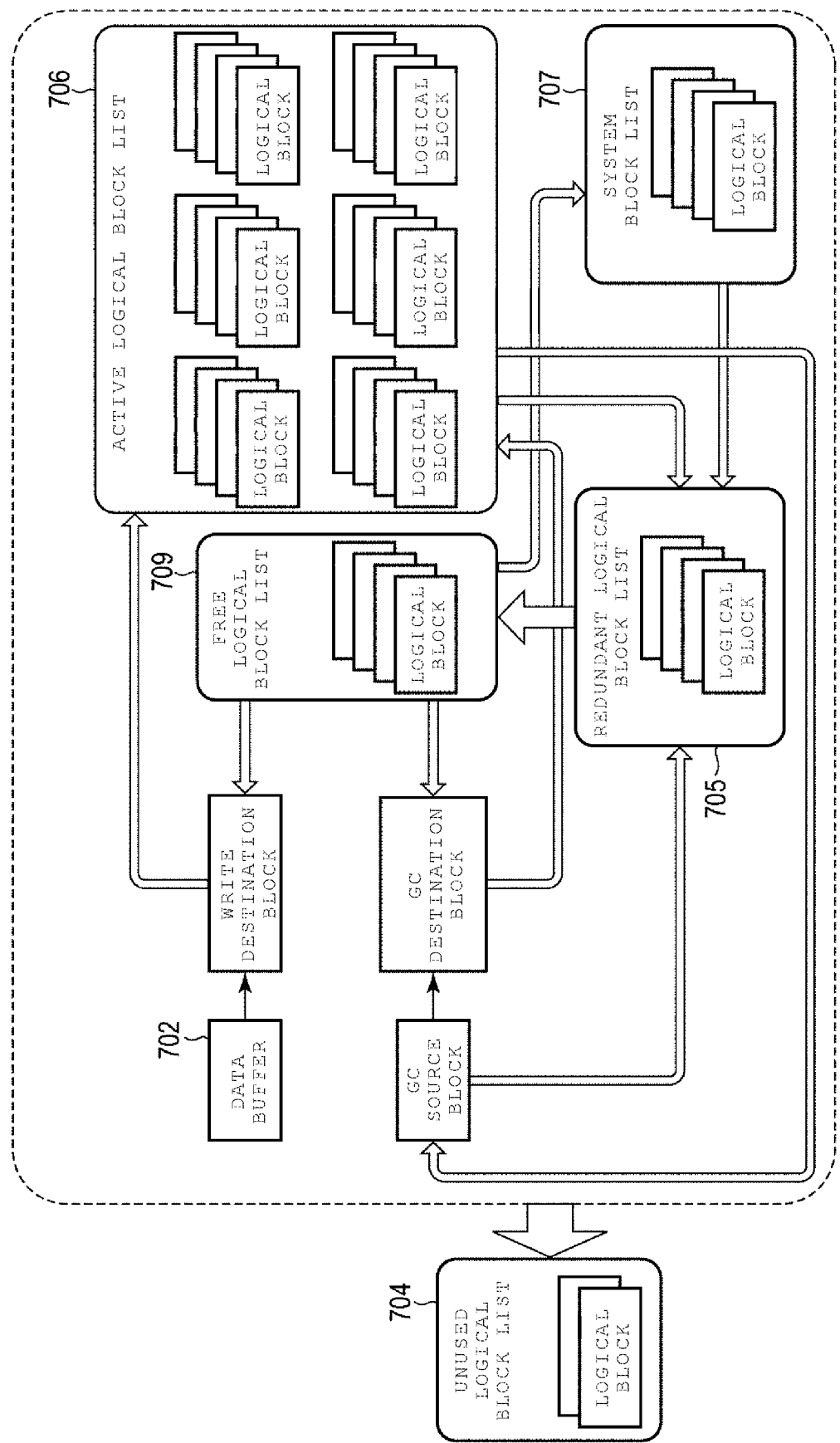
FIG. 12 is a diagram illustrating an example of a data write operation and a garbage collection operation executed in a memory system according to a second embodiment.

First, the transition of the logical blocks in the data write operation and the GC operation of the memory system 3 according to the second embodiment will be described. FIG. 12 is a diagram illustrating an example of the data write operation and the GC operation executed in the memory system 3 according to the second embodiment.

The controller 5 executes the data write operation. As the data write operation is repeated, when all the data stored in any active logical block becomes invalid data, the controller 5 registers the logical block in the redundant logical block list 705. In other words, the controller 5 allows the logical blocks that are to be reassigned as free logical blocks to be reassigned as the redundant logical blocks instead. The logical block to be reassigned as the free logical block is the logical block that does not include valid data. The controller 5 selects the logical blocks of which number is the same as the number of logical blocks registered in the redundant logical block list 705 from the redundant logical blocks. The controller 5 registers the selected redundant logical block in the free logical block list 709. Accordingly, the overprovisioning ratio of the memory system 3 is not reduced even when the logical block to be reassigned as the free logical block reassigned as the redundant logical block.

In addition, the controller 5 executes the GC operation. In the GC operation, the GC source block that does not include valid data due to the writing of the valid data to the GC destination block is registered in the redundant logical block list 705. The logical blocks of which number is the same as the number of logical blocks registered in the redundant logical block list 705 are selected from the redundant logical blocks. The controller 5 registers the selected redundant logical block in the free logical block list 709.

In this manner, the controller 5 registers the logical blocks that do not include valid data in the redundant logical block list 705. The controller 5 selects the logical blocks from the logical blocks registered in the redundant logical block list 705. The controller 5 registers the selected logical block in the free logical block list 709. Herein, the logical blocks that do not include valid data can be generated from the data overwriting, the GC operation, or the operation based on the invalidation command.

In addition, as for the system blocks, the system block in which all the stored data are invalid data is registered in the redundant logical block list 705. The controller 5 selects the logical blocks of which number is the same as the number of logical blocks registered in the redundant logical block list 705 from the redundant logical blocks. The controller 5 registers the selected redundant logical block in the free logical block list 709. In addition, when there is no system block to which management information of the new memory system 3 can be written, the controller 5 selects any free logical block and registers the selected free logical block in the system block list 707.

Figure 13:
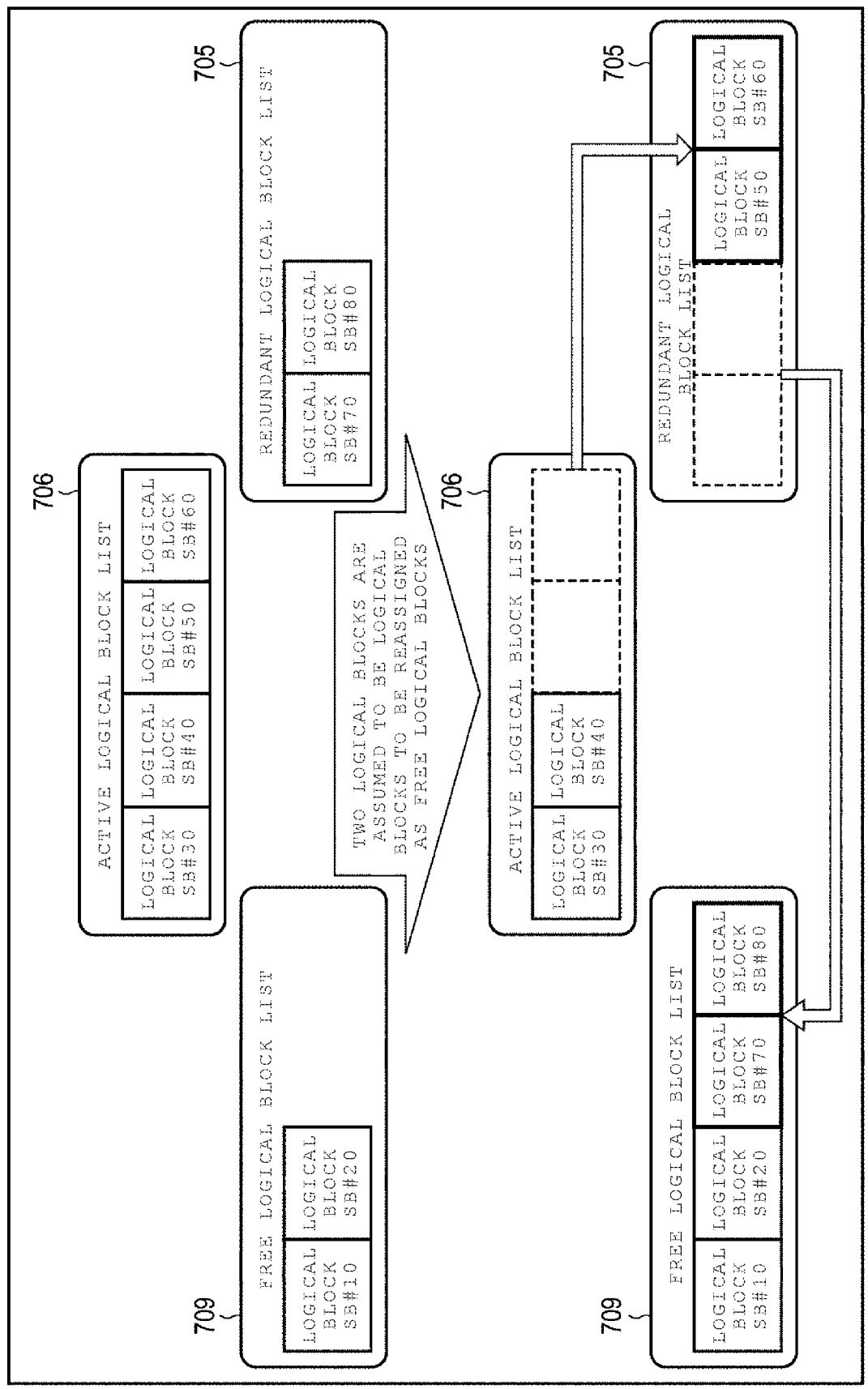
FIG. 13 is a diagram illustrating an example of a registration operation of a free block in a redundant logical block list, which is executed in the memory system according to the second embodiment.

Next, registration operation in the redundant logical block list 705 will be described. FIG. 13 is a diagram illustrating an example of the registration operation of the logical block to be a free block in the redundant logical block list, which is executed in the memory system 3 according to the second embodiment.

First, in FIG. 13, the logical blocks SB #10 and SB #20 are free logical blocks registered in the free logical block list 709. The logical blocks SB #30, SB #40, SB #50, and SB #60 are the active logical blocks registered in the active logical block list 706. Further, the logical blocks SB #70 and SB #80 are redundant logical blocks registered in the redundant logical block list 705.

Herein, it is assumed that all the data stored in the logical blocks SB #50 and SB #60, which are the active logical blocks, are invalid data. For example, the logical blocks SB #50 and SB #60 are selected as the GC source blocks, and by writing valid data stored in the logical blocks SB #50 and SB #60 to other logical blocks, the logical blocks SB #50 and SB #60 become the logical blocks to be reassigned as the free logical blocks.

The controller 5 registers the logical blocks SB #50 and SB #60 which are two logical blocks to be reassigned as the free logical blocks in the redundant logical block list 705. The logical blocks SB #50 and SB #60 are reassigned as the redundant logical blocks.

The controller 5 selects two logical blocks among the logical blocks registered in the redundant logical block list 705. Herein, the controller 5 selects the logical blocks SB #70 and SB #80. The controller 5 registers the selected two logical blocks in the free logical block list 709. The logical blocks SB #70 and SB #80 are reassigned as the free logical blocks.

Thus, the logical blocks registered in the free logical block list 709 are the logical blocks SB #10, SB #20, SB #70, and SB #80. The logical blocks registered in the active logical block list 706 are the logical blocks SB #30 and SB #40. In addition, the logical blocks registered in the redundant logical block list 705 are the logical blocks SB #50 and SB #60.

In this manner, before and after the transition of the logical blocks, the sum of the number of active logical blocks and the number of free logical blocks, which are the logical blocks available for the data writing and the number of redundant logical blocks do not change. The memory system 3 uses the redundant logical blocks for the data writing while maintaining the overprovisioning ratio of the memory system 3.

Figure 14:
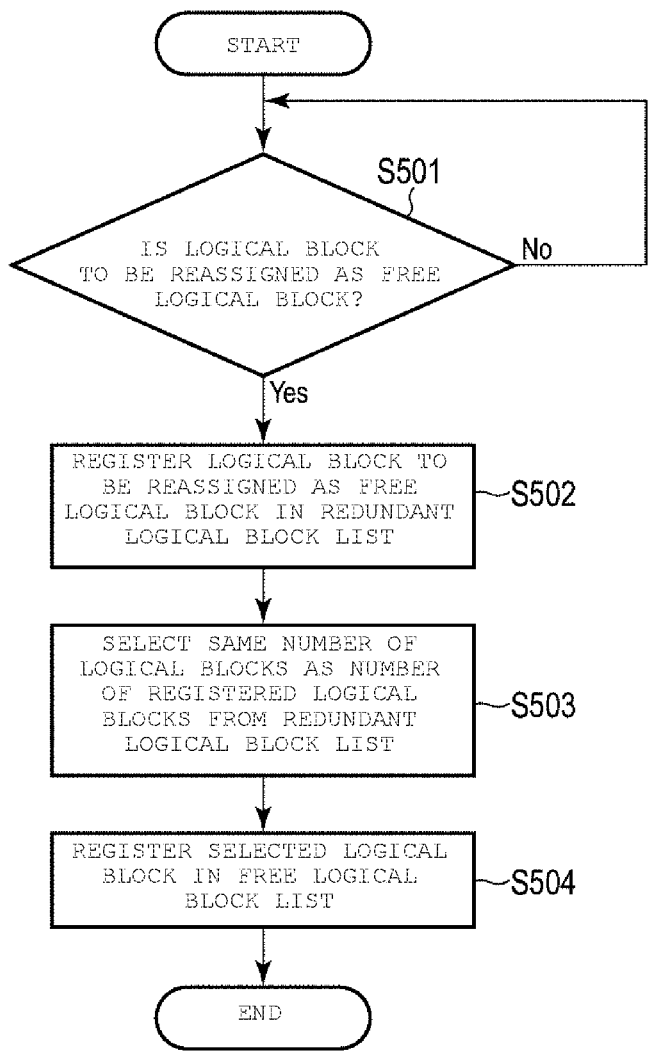
FIG. 14 is a flowchart illustrating a procedure of a logical block management process executed in the memory system according to the second embodiment.

Next, a logical block management process in the memory system 3 will be described. FIG. 14 is a flowchart illustrating a procedure of the logical block management process executed in the memory system 3 according to the second embodiment.

First, the controller 5 determines whether any active logical block is the logical block to be reassigned as the free logical block (S501). The data stored in the active logical block become invalid data due to the data overwriting or the like. The active logical block that does not include valid data becomes a logical block that is to be reassigned as the free logical block.

When there is no logical block to be reassigned as the free logical block (No in S501), the controller 5 waits until any active logical block becomes the logical block to be reassigned as the free logical block.

When there is a logical block to be reassigned as the free logical block (Yes in S501), the controller 5 registers the logical block to be reassigned as the free logical block in the redundant logical block list 705 (S502).

The controller 5 selects the logical blocks of which number is the same as the number of logical blocks registered in the redundant logical block list 705 in S502 from the logical blocks registered in the redundant logical block list 705 (S503).

The controller 5 registers the redundant logical block selected in S503 in the free logical block list 709 (S504).

It is noted that, when the number of logical blocks registered in advance in the redundant logical block list 705 is 0 when the logical block to be reassigned as the free logical block is registered in the redundant logical block list 705 in S502, in S503, the controller 5 selects the logical block registered in the redundant logical block list 705 in S502. Then, the controller 5 registers the logical block selected in S502 in the free logical block list 709. That is, the controller 5 registers the logical blocks to be reassigned as the free logical blocks in the free logical block list 709.

Next, a redundant logical block selection process will be described. The memory system 3 according to the second embodiment selects the logical blocks to be registered in the free logical block list 709 from the logical blocks registered in the redundant logical block list 705. At this time, the memory system 3 according to the second embodiment selects the redundant logical block by referring to the number of times of erase operations of each redundant logical block, or referring to the gear ratio similarly to the memory system 3 according to the first embodiment.

Figures 15A, 15B, 16:
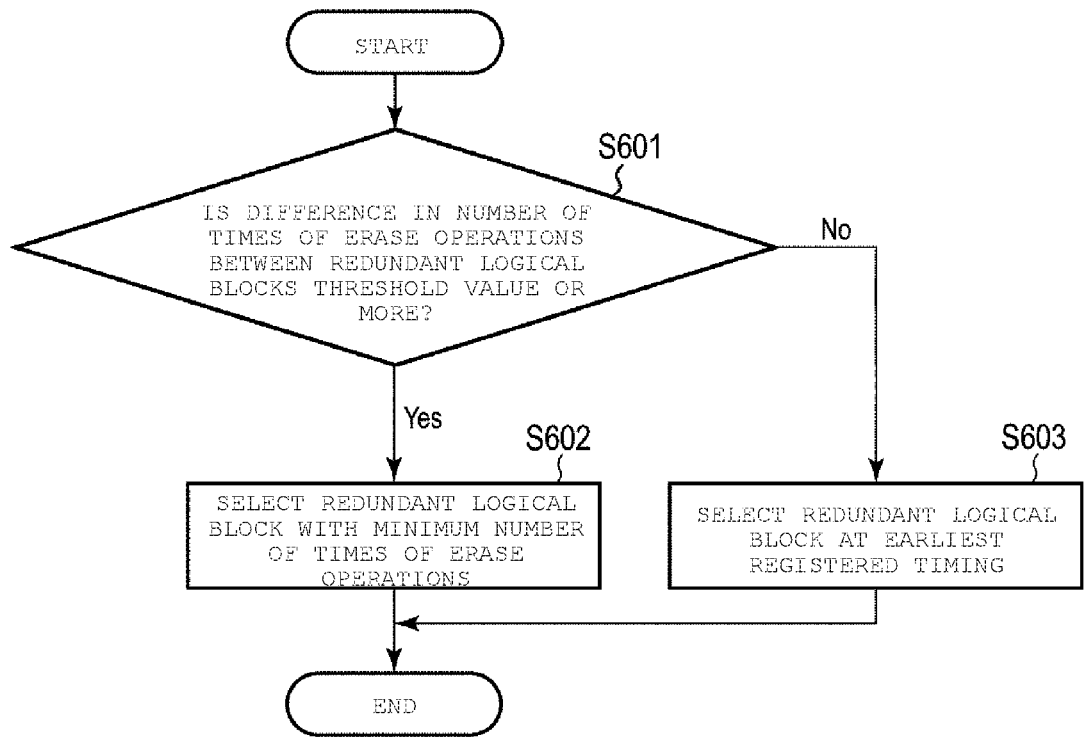
FIGS. 15A and 15B are diagrams illustrating a logical block selection process based on a wear rate executed in the memory system according to the second embodiment.
FIG. 16 is a flowchart illustrating a procedure of a logical block selection process based on the wear rate, which is executed in the memory system according to the second embodiment.

FIGS. 15A and 15B are diagrams illustrating the logical block selection process based on the wear rate executed in the memory system 3 according to the second embodiment. Herein, the logical blocks SB #10, SB #20, SB #30, and SB #40 are registered in the redundant logical block list 705.

FIG. 15A illustrates a case where the difference in the number of times of erase operations between the redundant logical blocks is in a relatively small range. The case where the difference in the number of times of erase operations between the redundant logical blocks is in the relatively small range is, for example, a case where the difference between the maximum value and the minimum value of the number of times of erase operations for each redundant logical block is below a threshold value.

In FIG. 15A, the logical block SB #10 is the logical block earliest registered in the redundant logical block list 705, and the number of times of erase operations is 200. The logical block SB #20 is the second logical block registered in the redundant logical block list 705, and the number of times of erase operations is 220. The logical block SB #30 is the third logical block registered in the redundant logical block list 705, and the number of times of erase operations is 180. The logical block SB #40 is the fourth logical block registered in the redundant logical block list 705, and the number of times of erase operations is 210. Herein, the maximum value of the number of times of erase operations of redundant logical blocks is 220 for the logical block SB #20. In addition, the minimum value of the number of times of erase operations of the redundant logical blocks is 180 for the logical block SB #30. For this reason, the difference between the maximum and minimum values of the number of times of erase operations of the redundant logical blocks is 40, which is the difference between the number of times of erase operations of 220 and the number of times of erase operations of 180.

When the difference in the number of times of erase operations between the redundant logical blocks is in the relatively small range, the controller 5 selects the logical block with the earliest timing registered in the redundant logical block list 705 and registers the selected logical block in the free logical block list 709. Herein, the controller 5 selects the logical block SB #10 and registers the selected logical block SB #10 in the free logical block list 709.

Accordingly, when the redundant logical block list 705 manages the redundant logical blocks based on a registration order of the logical blocks, the logical blocks registered in the free logical block list 709 can be efficiently specified.

Meanwhile, FIG. 15B illustrates a case where the difference in the number of times of erase operations between the redundant logical blocks is not in a small range. The case where the difference in the number of times of erase operations between the redundant logical blocks is not in the small range is, for example, a case where the difference between the maximum value and the minimum value of the number of times of erase operations for each redundant logical block is the threshold value or more.

In FIG. 15B, the logical block SB #10 is the logical block earliest registered in the redundant logical block list 705, and the number of times of erase operations is 300. The logical block SB #20 is the second logical block registered in the redundant logical block list 705, and the number of times of erase operations is 200. The logical block SB #30 is the third logical block registered in the redundant logical block list 705, and the number of times of erase operations is 120. The logical block SB #40 is the fourth logical block registered in the redundant logical block list 705, and the number of times of erase operations is 210. Herein, the maximum value of the number of times of erase operations of the redundant logical block is the number of times of erase operations of 300 for the logical block SB #10, and the minimum value of the number of times of erase operations for the redundant logical block is the number of times of erase operations of 120 for the logical block SB #30. For this reason, the difference between the maximum value and the minimum value of the number of times of erase operations of the redundant logical blocks is 180, which is the difference between the number of times of erase operations of 300 and the number of times of erase operations of 120.

When the difference in the number of times of erase operations between redundant logical blocks is not in the relatively small range, the controller 5 selects the redundant logical block with the minimum value of the number of times of erase operations among the redundant logical blocks and registers the selected redundant logical block in the free logical block list 709. Herein, the controller 5 selects the logical block SB #30 and registers the selected logical block SB #30 in the free logical block list 709.

That is, the controller 5 selects the logical block with the lowest wear rate among the redundant logical blocks and reassigns the selected logical block as the free logical block. Accordingly, the controller 5 can average the wear rates of the logical blocks in the memory system 3. Herein, the case where the difference between the maximum value and the minimum value of the number of times of erase operations of each redundant logical block is used as an index of the variation in the wear rate of each redundant logical block is described, but instead of the difference between the maximum value and the minimum value of each redundant logical block, a standard deviation or variance of the number of times of erase operations of each redundant logical block may be used as the index of the variation in the wear rate of each redundant logical block.

Next, a logical block selection process based on the wear rate will be described. FIG. 16 is a flowchart illustrating a procedure of the logical block selection process based on the wear rate, which is executed in the memory system 3 according to the second embodiment.

First, the controller 5 determines whether the difference in the number of times of erase operations between the redundant logical blocks of the memory system 3 is the threshold value or more (S601). The controller 5, for example, determines whether the difference between the maximum and minimum values of the number of times of erase operations for each of the redundant logical blocks is the threshold value or more.

When the difference in the number of times of erase operations between the redundant logical blocks is the threshold value or more (Yes in S601), the controller 5 selects the redundant logical block with the minimum value of the number of times of erase operations (S602).

When the difference in the number of times of erase operations between the redundant logical blocks is less than the threshold value (No in S601), the controller 5 selects the redundant logical block at the earliest registered timing in the redundant logical block list 705 (S603).

Further, in the selection of the logical block to be registered in the free logical block list 709 from the logical blocks registered in the redundant logical block list 705, the memory system 3 according to the second embodiment may select the redundant logical block by referring to the gear ratio similarly to the memory system 3 according to the first embodiment described with reference to FIGS. 8 and 9.

At this time, when the gear ratio of the memory system 3 is higher than the threshold value, the controller 5 selects the bank group with the minimum number of free logical blocks. Then, the controller 5 selects any redundant logical block from the redundant logical blocks provided in the selected bank group and registers the selected redundant logical block in the free logical block list 709. In addition, when the gear ratio of the memory system 3 is lower than the threshold value, the controller 5 selects the bank group with the minimum number of logical blocks available for the data writing. Then, the controller 5 selects any redundant logical block from the redundant logical blocks provided in the selected bank group and registers the selected redundant logical block in the free logical block list 709.

As described above, according to the second embodiment, the controller 5 registers the active logical blocks that do not include valid data in the redundant logical block list 705. In response to the registration of the logical blocks in the redundant logical block list 705, the controller 5 selects the redundant logical blocks of which number is the same as the number of logical blocks registered in the redundant logical block list 705. The controller 5 registers the selected logical block in the free logical block list 709.

Further, similarly to the memory system 3 according to the first embodiment, the memory system 3 according to the second embodiment registers the redundant logical block in the free logical block list 709 when the overprovisioning ratio of the memory system 3 is below the threshold value. In this case, the logical block selection process based on the wear rate of the redundant logical blocks may be executed, as described with reference to FIGS. 15 and 14.

In addition, furthermore, also in the memory system 3 according to the second embodiment, the overprovisioning ratio and the endurance value can be calculated in the same manner as in the memory system 3 according to the first embodiment. At this time, the logical blocks registered in the redundant logical block list 705 are not calculated as a portion of the maximum storage capacity of the memory system 3. Therefore, in the memory system 3 according to the second embodiment, the endurance value is calculated by excluding the redundant logical blocks that can have the number of times of erase operations of 1 or more. Therefore, it becomes necessary to calculate a second endurance value, which is the endurance value in consideration of the redundant logical blocks.

Third Embodiment

Next, the memory system 3 according to the third embodiment will be described. In the memory system 3 according to the third embodiment, in addition to the second embodiment, the management of the redundant logical blocks is simplified by considering the redundant logical blocks in the maximum storage capacity.

In the following description, the memory system 3 according to the third embodiment will be described by focusing on the differences from the memory system 3 according to the second embodiment.

Figure 17:
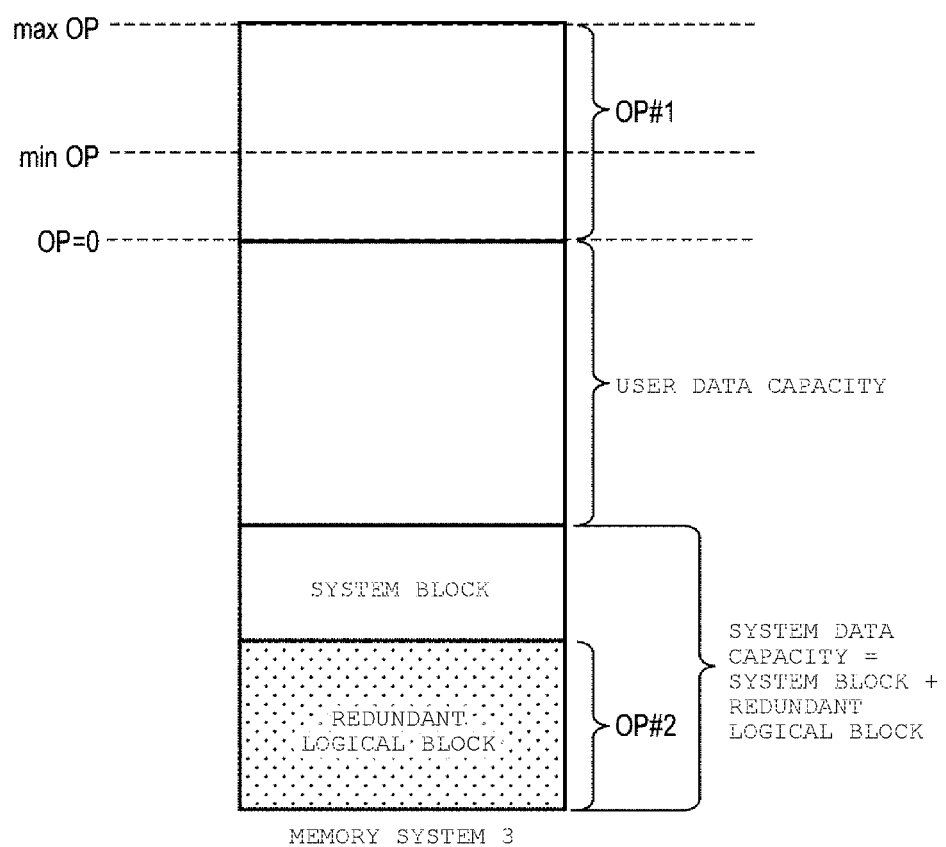
FIG. 17 is a diagram illustrating a relationship between logical blocks and capacities in a memory system according to a third embodiment.

First, the redundant logical blocks of the memory system 3 according to the third embodiment will be described. FIG. 17 is a diagram illustrating a relationship between the logical blocks and the capacities in the memory system 3 according to the third embodiment.

In FIG. 17, similarly to FIG. 4, the logical blocks corresponding to the capacities exceeding the max OP are managed as the redundant logical blocks. The redundant logical block is the logical block corresponding to OP #2.

In the memory system 3 according to the third embodiment, the system data capacity is the capacity corresponding to the sum of the number of system blocks and the number of redundant logical blocks. In other words, OP #2 is calculated as a portion of the system data capacity.

The maximum storage data capacity is the sum of the user data capacity, the system data capacity, and OP #1. Therefore, the maximum storage capacity of the memory system 3 according to the third embodiment includes OP #2 provided in the system data capacity.

The overprovisioning ratio of the memory system 3 according to the third embodiment is calculated by (maximum storage capacity−(user data capacity+system data capacity))/user data capacity×100, as in the first embodiment. OP #2 is provided in both the maximum storage capacity and the system data capacity. Therefore, the calculated overprovisioning ratio is the value using the redundant logical block corresponding to OP #2 as the calculation target. However, in the calculation of the overprovisioning ratio, OP #2 is canceled out by (maximum storage capacity−system data capacity).

Similarly to the first embodiment, the endurance value of the memory system 3 is also calculated by (total number of times of erase operations in the memory system 3/the number of logical blocks corresponding to the maximum storage capacity)/the upper limit of the number of times of erase operations per physical block×100. Herein, the number of redundant logical blocks corresponding to OP #2 is provided in the number of logical blocks corresponding to the maximum storage capacity. In addition, the number of times of erase operations for each redundant logical block is provided in the number of times of erase operations in the memory system 3. For this reason, the calculated endurance value is the value using the redundant logical block corresponding to OP #2 as the calculation target.

Figure 18:
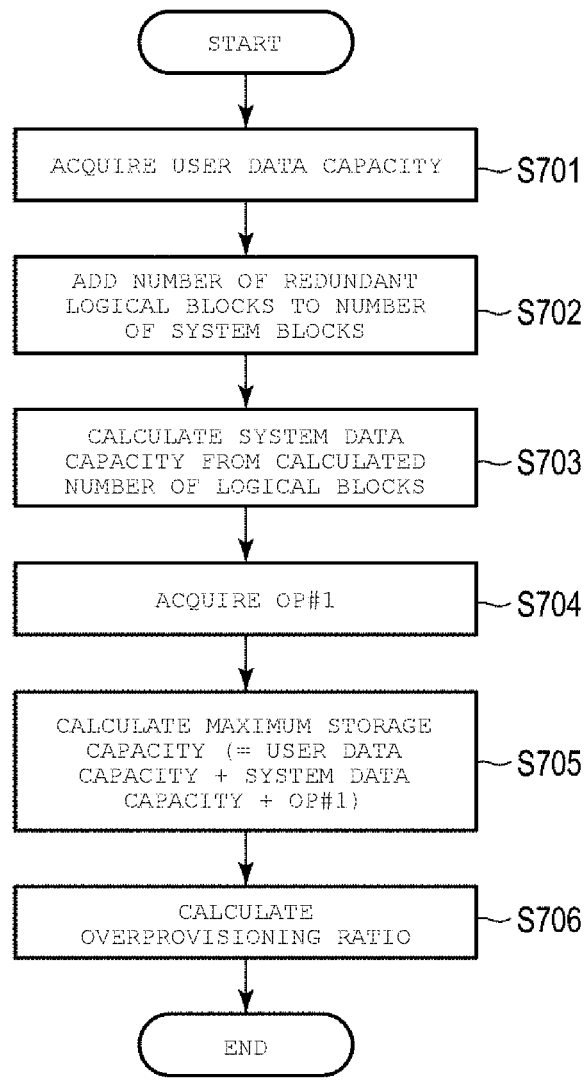
FIG. 18 is a flowchart illustrating a procedure of an overprovisioning ratio calculation process executed in the memory system according to the third embodiment.

Next, an overprovisioning ratio calculation process of the memory system 3 according to the third embodiment will be described. FIG. 18 is a flowchart illustrating a procedure of the overprovisioning ratio calculation process executed in the memory system 3 according to the third embodiment.

First, the controller 5 acquires the user data capacity of the memory system 3 (S701).

The controller 5 calculates the value obtained by adding the number of redundant logical blocks to the number of system blocks (S702).

The controller 5 calculates the system data capacity from the value calculated in S702 (S703). The calculated system data capacity is the sum of the capacity corresponding to the system block and the capacity corresponding to the redundant logical blocks.

The controller 5 acquires OP #1 (S704).

The controller 5 calculates the maximum storage capacity from the sum of the user data capacity acquired in S701, the system data capacity calculated in S703, and OP #1 acquired in S704 (S705).

The controller 5 calculates the overprovisioning ratio of the memory system 3 based on the user data capacity acquired in S701, OP #1 acquired in S704, and the maximum storage capacity calculated in S705 (S706).

Figure 19:
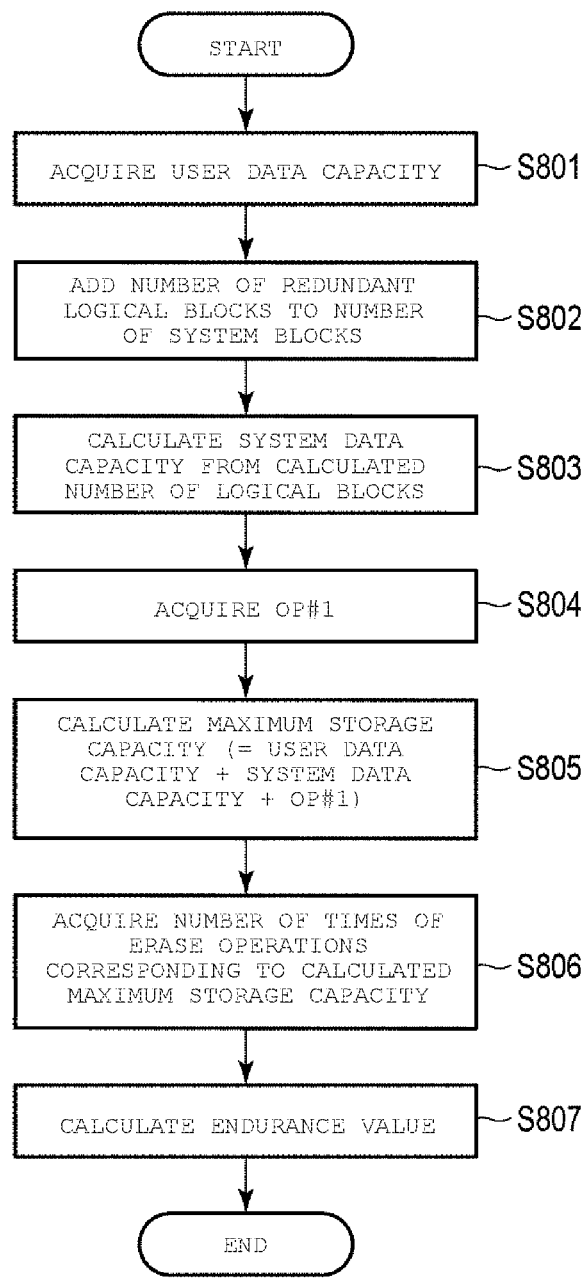
FIG. 19 is a flowchart illustrating a procedure of an endurance value calculation process executed in the memory system according to the third embodiment.

Next, an endurance value calculation process of the memory system 3 according to the third embodiment will be described. FIG. 19 is a flowchart illustrating the procedure of the endurance value calculation process executed in the memory system 3 according to the third embodiment.

First, the controller 5 calculates the maximum storage capacity of the memory system 3 by the same procedure as the procedure from S701 to S705 in FIG. 18 (S801 to S805).

The controller 5 acquires the number of times of erase operations corresponding to the maximum storage capacity calculated in S805 as the number of times of erase operations in the memory system 3 (S806). The number of times of erase operations acquired in S806 is the total number of times of erase operations for each logical block corresponding to the maximum storage capacity calculated in S805.

The controller 5 calculates the endurance value based on the maximum storage capacity calculated in S805, the number of times of erase operations acquired in S806, and the upper limit of the number of times of erase operations per physical block (S807).

As described above, according to the third embodiment, the controller 5 manages the logical blocks registered in the redundant logical block list 705 by including OP #2 in the system data capacity. Therefore, the controller 5 can calculate the overprovisioning ratio of the memory system 3 and the endurance value of the memory system 3 by including the redundant logical blocks with the number corresponding to the OP #2 as the calculation target.

In other words, the controller 5 of the memory system 3 according to the third embodiment includes the redundant logical block used for the data writing and not considered as the maximum storage capacity in the memory system 3 according to the second embodiment, in the maximum storage capacity. Accordingly, the controller 5 of the memory system 3 according to the third embodiment can easily manage the redundant logical blocks used for the data writing.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host, comprising:
   a nonvolatile memory including a plurality of physical blocks; and
   a controller configured to assign each of a plurality of block groups, each block group including a predetermined number or more of the physical blocks, to one of a plurality of categories, wherein
   the categories include a first category corresponding to block groups for storing user data, a second category corresponding to block groups for storing system data, a third category corresponding to redundant block groups in which neither the user data nor the system data can be stored, and a fourth category corresponding to defective block groups,
   the controller is configured to:
      obtain an overprovisioning capacity, which is a capacity of the nonvolatile memory exceeding a sum of a predetermined user data capacity and a system data capacity,
      assign block groups having a total capacity equal to a fraction of the overprovisioning capacity that is equal to a first threshold value, to the first category and second category, and block groups having a total capacity equal to a remaining part of the overprovisioning capacity to the third category, and
      when an overprovisioning ratio, which is equal to a total capacity of block groups in the first category exceeding the predetermined user data capacity divided by the predetermined user data capacity, falls below a second threshold value, reassign one or more block groups in the third category to the first category such that the overprovisioning ratio is equal to the second threshold value or higher.

2. The memory system according to claim 1, wherein the second threshold value is equal to the first threshold value divided by the predetermined user data capacity.

3. The memory system according to claim 1, wherein the controller is further configured to register the block groups in the first category to a first block group list, the block groups in the second category to a second block group list, the block groups in the third category to a third block group list, and the block groups in the fourth category to a fourth block group list.

4. The memory system according to claim 1, wherein the controller is further configured to select the one or more block groups in the third category to be reassigned to the first category based on a gear ratio, which is equal to an amount of data to be written to the nonvolatile memory based on commands from the host divided by an amount of data to be written to the nonvolatile memory through a background operation, and not based on commands from the host.

5. The memory system according to claim 4, wherein
   the plurality of block groups are further grouped into a plurality of block group sets including a first block group set and a second block group set, and
   the controller is further configured to select the one or more block groups in the third category to be reassigned to the first category from the first block group set when the gear ratio is greater than a third threshold, and from the second block group set when the gear ratio is less than the third threshold.

6. The memory system according to claim 5, wherein the first block group set is one of the plurality of block group sets that has a least number of block groups that are in the first category and store no valid user data or in the second category and store no valid system data.

7. The memory system according to claim 5, wherein the second block group set is one of the plurality of block group sets that has a least number of a sum of block groups in the overprovisioning capacity and block groups in the first category.

8. The memory system according to claim 1, wherein the controller is further configured to obtain an endurance value, which is a ratio of an average of erase counts of the block groups divided by a predetermined maximum erase count.

9. The memory system according to claim 1, wherein the controller is further configured to reassign one or more of blocks groups in the first category to the fourth category, when the one or more of blocks groups in the first category become defective.

10. The memory system according to claim 1, wherein
    the first category further includes a first subcategory corresponding to block groups that store valid user data and a second subcategory corresponding to block groups that store no valid user data, and
    the controller is further configured to reassign a block group that is in the first subcategory and in which valid user data is no longer stored to the second subcategory.

11. The memory system according to claim 1, wherein
    the first category further includes a first subcategory corresponding to block groups that store valid user data and a second subcategory corresponding to block groups that store no valid user data, and
    the controller is further configured to reassign a first number of block groups that are in the first subcategory and in which valid user data is no longer stored to the third category, and reassign the first number of block groups in the third category to the second subcategory.

12. The memory system according to claim 11, wherein the controller is further configured to select the first number of block groups in the third category to be reassigned to the second subcategory based on a largest difference among erase counts of block groups in the third category.

13. The memory system according to claim 12, wherein the controller is further configured to select the first number of block groups in the third category to be reassigned to the second subcategory in a chronological order of assignment into the third category, when the largest difference is less than a fourth threshold.

14. The memory system according to claim 13, wherein the controller is further configured to select the first number of block groups in the third category to be reassigned to the second subcategory in an ascending order of the erase counts, when the largest difference is greater than the fourth threshold.

15. The memory system according to claim 11, wherein the system data capacity is equal to a capacity of block groups in the second category.

16. The memory system according to claim 11, wherein the system data capacity is equal to sum of a capacity of block groups in the second category and a capacity of block groups in the third category.

17. A method for controlling a memory system connectable to a host and including a nonvolatile memory including a plurality of physical blocks, the method comprising:

assigning each of a plurality of block groups, each block group including a predetermined number or more of the physical blocks, to one of a plurality of categories, wherein the categories include a first category corresponding to block groups for storing user data, a second category corresponding to block groups for storing system data, a third category corresponding to redundant block groups in which neither the user data nor the system data can be stored, and a fourth category corresponding to defective block groups, said assigning comprises:

obtaining an overprovisioning capacity, which is a capacity of the nonvolatile memory exceeding a sum of a predetermined user data capacity and a system data capacity, assigning block groups having a total capacity equal to a fraction of the overprovisioning capacity that is equal to a first threshold value, to the first category, and block groups having a total capacity equal to a remaining part of the overprovisioning capacity to the third category, and when an overprovisioning ratio, which is equal to a total capacity of block groups in the first category exceeding the predetermined user data capacity divided by the predetermined user data capacity, falls below a second threshold value, reassigning one or more block groups in the third category to the first category such that the overprovisioning ratio is equal to the second threshold value or higher.

18. The method of claim 17, wherein the second threshold value is equal to the first threshold value divided by the predetermined user data capacity.

19. The method of claim 17, wherein said assigning further comprises:

selecting the one or more block groups in the third category to be reassigned to the first category based on a gear ratio, which is equal to an amount of data to be written to the nonvolatile memory based on commands from the host divided by an amount of data to be written to the nonvolatile memory through a background operation, and not based on commands from the host.

20. The method of claim 19, wherein the plurality of block groups are further grouped into a plurality of block group sets including a first block group set and a second block group set, and the one or more block groups in the third category are selected to be reassigned to the first category from the first block group set when the gear ratio is greater than a third threshold, and from the second block group set when the gear ratio is less than the third threshold.

* * * * *